(12) United States Patent
Yang et al.

(10) Patent No.: US 11,956,788 B2
(45) Date of Patent: Apr. 9, 2024

(54) EXPIRATION PERIODS FOR LOW LATENCY COMMUNICATIONS

(71) Applicant: QUALCOMM Incorporated, San Diego, CA (US)

(72) Inventors: Wei Yang, San Diego, CA (US); Jing Jiang, San Diego, CA (US); Wanshi Chen, San Diego, CA (US); Peter Gaal, San Diego, CA (US); Tingfang Ji, San Diego, CA (US); Chih-Ping Li, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 16/508,843

(22) Filed: Jul. 11, 2019

(65) Prior Publication Data
US 2020/0037352 A1 Jan. 30, 2020

Related U.S. Application Data

(60) Provisional application No. 62/712,132, filed on Jul. 30, 2018.

(51) Int. Cl.
*H04W 72/23* (2023.01)
*H04L 1/1812* (2023.01)
(Continued)

(52) U.S. Cl.
CPC ......... *H04W 72/23* (2023.01); *H04L 1/1819* (2013.01); *H04L 5/0055* (2013.01);
(Continued)

(58) Field of Classification Search
CPC ... H04W 72/04; H04W 72/042; H04W 72/14; H04W 72/1289; H04W 72/1242;
(Continued)

(56) References Cited

U.S. PATENT DOCUMENTS

2002/0089959 A1* 7/2002 Fischer ................ H04L 47/32
370/338
2005/0157720 A1* 7/2005 Chandhok ........... H04L 12/1868
370/390
(Continued)

OTHER PUBLICATIONS

International Search Report and Written Opinion—PCT/US2019/041653—ISA/EPO—dated Nov. 25, 2019.
(Continued)

*Primary Examiner* — Sudesh M Patidar
(74) *Attorney, Agent, or Firm* — QUALCOMM Incorporated

(57) ABSTRACT

Methods, systems, and devices for wireless communications are described. A transmitting device may transmit an expiration indication to a receiving device as part of a scheduling message for a transport block. The expiration indication may provide information related to an expiration time for the transport block. If the expiration time is reached prior to successful reception by a receiving device, the receiving device may assume that the transport block has expired and may refrain from transmitting a retransmission grant, or may empty a hybrid automatic repeat request (HARM) buffer associated with the transport block. If the transmitting device fails to successfully receive an indication from the receiving device of a successful reception of the transport block prior to the expiration period, the transmitting device may also assume that the transport block has expired.

30 Claims, 18 Drawing Sheets

(51) Int. Cl.
*H04L 5/00* (2006.01)
*H04W 28/02* (2009.01)
*H04W 72/20* (2023.01)
*H04W 72/566* (2023.01)

(52) U.S. Cl.
CPC ....... *H04W 28/0278* (2013.01); *H04W 72/20* (2023.01); *H04W 72/569* (2023.01)

(58) Field of Classification Search
CPC ......... H04W 72/0406; H04W 28/0278; H04W 28/0975; H04W 28/0967; H04W 28/0992; H04W 28/10; H04W 28/12; H04W 28/26; H04W 76/20; H04W 76/28; H04W 76/34; H04W 76/38; H04L 1/188; H04L 1/1812; H04L 1/1819; H04L 1/1822; H04L 1/1848; H04L 1/1854; H04L 1/1887; H04L 1/1896; H04L 5/0055
See application file for complete search history.

(56) References Cited

U.S. PATENT DOCUMENTS

| | | | | |
|---|---|---|---|---|
| 2008/0215948 A1* | 9/2008 | Pinheiro | ............... | H04L 1/1887 714/748 |
| 2009/0285141 A1* | 11/2009 | Cai | ................... | H04W 52/0216 370/311 |
| 2009/0300457 A1* | 12/2009 | Kuo | ..................... | H04L 1/1887 714/749 |
| 2011/0002253 A1* | 1/2011 | Cha | ................... | H04W 52/0235 370/311 |
| 2011/0268003 A1* | 11/2011 | Li | ..................... | H04W 52/0216 370/311 |
| 2014/0286240 A1* | 9/2014 | Kim | ..................... | H04W 76/28 370/328 |
| 2016/0143017 A1* | 5/2016 | Yang | ..................... | H04L 5/0053 370/329 |
| 2016/0285594 A1* | 9/2016 | Chen | ..................... | H04L 1/1607 |
| 2017/0134147 A1* | 5/2017 | Terry | ..................... | H04L 1/188 |
| 2018/0262303 A1* | 9/2018 | Jia | ..................... | H03M 13/2906 |
| 2018/0278368 A1* | 9/2018 | Kim | ..................... | H04L 1/0043 |
| 2018/0279186 A1* | 9/2018 | Park | ..................... | H04W 36/30 |
| 2018/0279274 A1* | 9/2018 | Sun | ..................... | H04W 72/04 |
| 2018/0367262 A1* | 12/2018 | Hwang | ..................... | H04L 1/1854 |
| 2019/0097874 A1* | 3/2019 | Zhou | ..................... | H04L 5/0023 |
| 2019/0149197 A1* | 5/2019 | Byun | ..................... | H04B 7/0628 375/262 |
| 2019/0149274 A1* | 5/2019 | Freda | ..................... | H04W 72/0453 370/329 |
| 2019/0182871 A1* | 6/2019 | Aminaka | ..................... | H04W 74/008 |
| 2019/0246378 A1* | 8/2019 | Islam | ..................... | H04W 72/042 |
| 2019/0335396 A1* | 10/2019 | Yang | ..................... | H04L 1/1883 |
| 2019/0386780 A1* | 12/2019 | Zou | ..................... | H04L 1/1877 |
| 2019/0386791 A1* | 12/2019 | Wong | ..................... | H04L 1/1861 |
| 2020/0008225 A1* | 1/2020 | Lee | ..................... | H04L 5/0053 |
| 2020/0092900 A1* | 3/2020 | Dudda | ..................... | H04W 80/02 |
| 2020/0119853 A1* | 4/2020 | Hassan Hussein | ... | H04L 1/1858 |
| 2020/0287665 A1* | 9/2020 | Lee | ..................... | H04L 1/1874 |
| 2020/0328848 A1* | 10/2020 | He | ..................... | H04L 1/1854 |
| 2020/0396026 A1* | 12/2020 | Chang | ..................... | H04W 74/04 |
| 2021/0076409 A1* | 3/2021 | Goto | ..................... | H04L 1/0025 |

OTHER PUBLICATIONS

Partial International Search Report—PCT/US2019/041653—ISA/EPO—dated Sep. 26, 2019.

Vivo: "Discussion on DCI Format for URLLC", 3GPP Draft; R1-1806059 Discussion on DCI Format for URLLC, 3rd Generation Partnership Project (3GPP), Mobile Competence Centre; 650, Route Des Lucioles; F-06921 Sophia-Antipolis Cedex ; France, vol. RAN WG1, No. Busan, Korea; May 21, 2018-May 25, 2018 May 20, 2018, XP051441274, Retrieved from the Internet: URL:http://www.3gpp.org/ftp/Meetings%5F3GPP%5FSYNC/RAN1/Docs/ [retrieved on May 20, 2018], 7 pages.

* cited by examiner

EXPIRATION PERIODS FOR LOW LATENCY COMMUNICATIONS

CROSS REFERENCE

The present Application for Patent claims the benefit of U.S. Provisional Patent Application No. 62/712,132 by YANG et al., entitled "EXPIRATION PERIODS FOR LOW LATENCY COMMUNICATIONS," filed Jul. 30, 2018, assigned to the assignee hereof, and expressly incorporated herein.

BACKGROUND

The following relates generally to wireless communications, and more specifically to expiration periods for low latency communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may support ultra-reliable low latency communications (URLLC). URLLC may require stricter latency and error rate requirements as compared to conventional wireless communications. However, certain issues causing delay in transmission or reception of URLLC may be known only by the device scheduling the URLLC. This may cause the non-scheduling device to unnecessarily expend resources waiting for transmissions or retransmissions of URLLC transport blocks.

SUMMARY

The described techniques relate to improved methods, systems, devices, and apparatuses that support expiration periods for low latency communications. Generally, the described techniques provide a mechanism for communicating an expiration time for a transport block to a receiving device. If the transport block is not successfully received by the non-scheduling device prior to the expiration time, the receiving device may assume that the transport block has expired and may refrain from transmitting a retransmission grant, or may empty a hybrid automatic repeat request (HARQ) buffer associated with the transport block. Likewise, if the transmitting device fails to successfully receive an indication from the receiving device of a successful reception of the transport block prior to the expiration period, the transmitting device may also assume that the transport block has expired.

Furthermore, a retransmission deadline may be provided to the receiving device for the transport block. The receiving device may detect a failure in receiving the transport block and may transmit a retransmission request message. The retransmission deadline may provide a receiving device a time period in which to transmit a second retransmission request. The retransmission deadline may be dependent upon the expiration time such that the retransmission deadline expires prior to or at the same time that the expiration time expires. Thus, the techniques described herein may allow for greater coordination between scheduling and non-scheduling devices for communications with strict latency requirements.

A method of wireless communication at a user equipment (UE) is described. The method may include receiving a downlink control information (DCI) block including a downlink grant for a downlink transport block and an indication of an expiration time of the downlink transport block, monitoring a wireless channel for the downlink transport block according to the downlink grant of the DCI block, and terminating a HARQ process associated with the downlink transport block based on the indicated expiration time.

An apparatus for wireless communication at a UE is described. The apparatus may include a processor, memory in electronic communication with the processor, and instructions stored in the memory. The instructions may be executable by the processor to receive a DCI block including a downlink grant for a downlink transport block and an indication of an expiration time of the downlink transport block, monitor a wireless channel for the downlink transport block according to the downlink grant of the DCI block, and terminate a HARQ process associated with the downlink transport block based on the indicated expiration time.

Another apparatus for wireless communication at a UE is described. The apparatus may include means for receiving a DCI block including a downlink grant for a downlink transport block and an indication of an expiration time of the downlink transport block, monitoring a wireless channel for the downlink transport block according to the downlink grant of the DCI block, and terminating a HARQ process associated with the downlink transport block based on the indicated expiration time.

A non-transitory computer-readable medium storing code for wireless communication at a UE is described. The code may include instructions executable by a processor to receive a DCI block including a downlink grant for a downlink transport block and an indication of an expiration time of the downlink transport block, monitor a wireless channel for the downlink transport block according to the downlink grant of the DCI block, and terminate a HARQ process associated with the downlink transport block based on the indicated expiration time.

Some examples of the method, apparatuses, and non-transitory computer-readable medium described herein may further include operations, features, means, or instructions for determining the expiration time of the downlink transport block based on the indication, and where the expiration time may be determined with respect to one or more of: an ending symbol of a scheduled HARQ-acknowledgment (HARQ-ACK) feedback for the downlink transport block, an end of a physical downlink shared channel transmission containing the downlink transport block, or an end of a base station processing time following a scheduled HARQ-ACK feedback for the downlink transport block.

Some examples of the method, apparatuses, and non-transitory computer-readable medium described herein may further include operations, features, means, or instructions for determining a value of a new data indicator (NDI) associated with the DCI block, and where the expiration time may be determined further based on the value of the NDI.

Some examples of the method, apparatuses, and non-transitory computer-readable medium described herein may further include operations, features, means, or instructions for determining whether to transmit a HARQ-acknowledgement (HARQ-ACK) feedback for the downlink transport block based on the expiration time.

In some examples of the method, apparatuses, and non-transitory computer-readable medium described herein, terminating the HARQ process associated with the downlink transport block may include operations, features, means, or instructions for refraining from sending HARQ feedback for the downlink transport block based on the expiration time.

Some examples of the method, apparatuses, and non-transitory computer-readable medium described herein may further include operations, features, means, or instructions for identifying a failure to successfully decode the downlink transport block, and transmitting a first non-acknowledgment (NACK) for the downlink transport block.

Some examples of the method, apparatuses, and non-transitory computer-readable medium described herein may further include operations, features, means, or instructions for determining a retransmission deadline for the downlink transport block based on the expiration time.

Some examples of the method, apparatuses, and non-transitory computer-readable medium described herein may further include operations, features, means, or instructions for receiving a configuration message indicating the retransmission deadline for the downlink transport block.

In some examples of the method, apparatuses, and non-transitory computer-readable medium described herein, the retransmission deadline may be determined based on the downlink grant.

Some examples of the method, apparatuses, and non-transitory computer-readable medium described herein may further include operations, features, means, or instructions for transmitting a second NACK for the downlink transport block based on an expiration of the retransmission deadline.

Some examples of the method, apparatuses, and non-transitory computer-readable medium described herein may further include operations, features, means, or instructions for determining a retransmission grant may be not received prior to expiration of the retransmission deadline; where transmitting the second NACK may be further based on determining the retransmission grant may be not received.

In some examples of the method, apparatuses, and non-transitory computer-readable medium described herein, the first NACK and the second NACK may be transmitted over different uplink control channel resources.

In some examples of the method, apparatuses, and non-transitory computer-readable medium described herein, the second NACK may be transmitted at a greater transmit power than the first NACK.

In some examples of the method, apparatuses, and non-transitory computer-readable medium described herein, the second NACK may be transmitted as a one-bit uplink control information (UCI) block.

In some examples of the method, apparatuses, and non-transitory computer-readable medium described herein, the second NACK may have a higher priority than at least one other uplink control information (UCI) transmission.

In some examples of the method, apparatuses, and non-transitory computer-readable medium described herein, the indication of the expiration time includes an index to a table of standard expiration time values.

Some examples of the method, apparatuses, and non-transitory computer-readable medium described herein may further include operations, features, means, or instructions for determining whether a transmission opportunity exists for a HARQ feedback for the downlink transport block prior to the indicated expiration time.

Some examples of the method, apparatuses, and non-transitory computer-readable medium described herein may further include operations, features, means, or instructions for determining an index to a table of standard expiration time values based on at least one parameter of the DCI block or at least one parameter of a downlink control channel carrying the DCI block.

In some examples of the method, apparatuses, and non-transitory computer-readable medium described herein, terminating the HARQ process associated with the downlink transport block may include operations, features, means, or instructions for emptying a transmission buffer corresponding to the downlink transport block.

Some examples of the method, apparatuses, and non-transitory computer-readable medium described herein may further include operations, features, means, or instructions for identifying a failure to successfully decode the received downlink transport block prior to the indicated expiration time, and sending an indication of the identified failure to an upper layer of the UE.

A method of wireless communication at a base station is described. The method may include determining an expiration time of a downlink transport block, transmitting a DCI block including a downlink grant for the downlink transport block and an indication of the expiration time of the downlink transport block, transmitting the downlink transport block, and refraining from retransmitting the downlink transport block based on the expiration time.

An apparatus for wireless communication at a base station is described. The apparatus may include a processor, memory in electronic communication with the processor, and instructions stored in the memory. The instructions may be executable by the processor to determine an expiration time of a downlink transport block, transmit a DCI block including a downlink grant for the downlink transport block and an indication of the expiration time of the downlink transport block, transmit the downlink transport block, and refrain from retransmitting the downlink transport block based on the expiration time.

Another apparatus for wireless communication at a base station is described. The apparatus may include means for determining an expiration time of a downlink transport block, transmitting a DCI block including a downlink grant for the downlink transport block and an indication of the expiration time of the downlink transport block, transmitting the downlink transport block, and refraining from retransmitting the downlink transport block based on the expiration time.

A non-transitory computer-readable medium storing code for wireless communication at a base station is described. The code may include instructions executable by a processor to determine an expiration time of a downlink transport block, transmit a DCI block including a downlink grant for the downlink transport block and an indication of the expiration time of the downlink transport block, transmit the downlink transport block, and refrain from retransmitting the downlink transport block based on the expiration time.

In some examples of the method, apparatuses, and non-transitory computer-readable medium described herein, an ending symbol of a scheduled NACK for the downlink transport block, an end of a physical downlink shared channel transmission containing the downlink transport block, or an end of a base station processing time following a scheduled NACK for the downlink transport block.

Some examples of the method, apparatuses, and non-transitory computer-readable medium described herein may further include operations, features, means, or instructions for configuring a NDI associated with the DCI to further indicate the expiration time and transmitting the NDI with the DCI block.

Some examples of the method, apparatuses, and non-transitory computer-readable medium described herein may further include operations, features, means, or instructions for receiving a first NACK for the downlink transport block and transmitting at least a portion of the downlink transport block based on the received first NACK and prior to the expiration of the indicated expiration time.

Some examples of the method, apparatuses, and non-transitory computer-readable medium described herein may further include operations, features, means, or instructions for determining a retransmission deadline for the downlink transport block. Some examples of the method, apparatuses, and non-transitory computer-readable medium described herein may further include operations, features, means, or instructions for configuring a configuration message indicating the retransmission deadline for the downlink transport block and transmitting the configuration message.

Some examples of the method, apparatuses, and non-transitory computer-readable medium described herein may further include operations, features, means, or instructions for configuring the downlink grant to indicate the retransmission deadline.

Some examples of the method, apparatuses, and non-transitory computer-readable medium described herein may further include operations, features, means, or instructions for receiving a second NACK for the downlink transport block based on an expiration of the retransmission deadline. In some examples of the method, apparatuses, and non-transitory computer-readable medium described herein, the first NACK and the second NACK may be received over different uplink control channel resources.

In some examples of the method, apparatuses, and non-transitory computer-readable medium described herein, the second NACK may be received at a greater reception power than the first NACK. In some examples of the method, apparatuses, and non-transitory computer-readable medium described herein, the second NACK may be received as a one-bit UCI block.

In some examples of the method, apparatuses, and non-transitory computer-readable medium described herein, the second NACK may have a higher priority than at least one other UCI transmission. In some examples of the method, apparatuses, and non-transitory computer-readable medium described herein, the indication of the expiration time includes an index to a table of standard expiration time values.

A method of wireless communication at a UE is described. The method may include determining an expiration time of an uplink transport block, transmitting an indication of the expiration time of the uplink transport block, transmitting the uplink transport block, determining an expiration of the indicated expiration time, and refraining from retransmitting the uplink transport block based on the determined expiration.

An apparatus for wireless communication at a UE is described. The apparatus may include a processor, memory in electronic communication with the processor, and instructions stored in the memory. The instructions may be executable by the processor to determine an expiration time of an uplink transport block, transmit an indication of the expiration time of the uplink transport block, transmit the uplink transport block, determine an expiration of the indicated expiration time, and refrain from retransmitting the uplink transport block based on the determined expiration.

Another apparatus for wireless communication at a UE is described. The apparatus may include means for determining an expiration time of an uplink transport block, transmitting an indication of the expiration time of the uplink transport block, transmitting the uplink transport block, determining an expiration of the indicated expiration time, and refraining from retransmitting the uplink transport block based on the determined expiration.

A non-transitory computer-readable medium storing code for wireless communication at a UE is described. The code may include instructions executable by a processor to determine an expiration time of an uplink transport block, transmit an indication of the expiration time of the uplink transport block, transmit the uplink transport block, determine an expiration of the indicated expiration time, and refrain from retransmitting the uplink transport block based on the determined expiration.

In some examples of the method, apparatuses, and non-transitory computer-readable medium described herein, an ending symbol of a service request (SR) message, or an end of a physical uplink shared channel transmission containing the uplink transport block.

Some examples of the method, apparatuses, and non-transitory computer-readable medium described herein may further include operations, features, means, or instructions for configuring a NDI associated with the uplink transport block to further indicate the expiration time and transmitting the NDI.

Some examples of the method, apparatuses, and non-transitory computer-readable medium described herein may further include operations, features, means, or instructions for receiving an uplink retransmission grant for the uplink transport block and transmitting at least a portion of the uplink transport block based on the received uplink retransmission grant and prior to the expiration of the indicated expiration time.

Some examples of the method, apparatuses, and non-transitory computer-readable medium described herein may further include operations, features, means, or instructions for determining a retransmission deadline for the uplink transport block. In some examples of the method, apparatuses, and non-transitory computer-readable medium described herein, the indication of the expiration time includes an index to a table of standard expiration time values.

In some examples of the method, apparatuses, and non-transitory computer-readable medium described herein, the indication of the expiration time may be transmitted as a multi-bit SR. In some examples of the method, apparatuses, and non-transitory computer-readable medium described herein, the indication of the expiration time may be transmitted over a grant-free uplink data channel, and where the indication of the expiration time may be separately encoded with uplink data.

In some examples of the method, apparatuses, and non-transitory computer-readable medium described herein, the indication of the expiration time may be transmitted in a buffer status report (BSR) message.

A method of a method of wireless communication at a base station is described. The method may include transmitting a retransmission grant prior to expiration of an expiration time of an uplink transport block, receiving an indication of the expiration time of the uplink transport block, identifying a failure to successfully receive the uplink transport block prior to the indicated expiration time, and terminating a retransmission grant process associated with the uplink transport block based on the identified failure.

An apparatus for a method of wireless communication at a base station is described. The apparatus may include a processor, memory in electronic communication with the processor, and instructions stored in the memory. The instructions may be executable by the processor to transmit a retransmission grant prior to expiration of an expiration time of an uplink transport block, receive an indication of the expiration time of the uplink transport block, identify a failure to successfully receive the uplink transport block prior to the indicated expiration time, and terminate a retransmission grant process associated with the uplink transport block based on the identified failure.

Another apparatus for a method of wireless communication at a base station is described. The apparatus may include means for transmitting a retransmission grant prior to expiration of an expiration time of an uplink transport block, receiving an indication of the expiration time of the uplink transport block, identifying a failure to successfully receive the uplink transport block prior to the indicated expiration time, and terminating a retransmission grant process associated with the uplink transport block based on the identified failure.

A non-transitory computer-readable medium storing code for a method of wireless communication at a base station is described. The code may include instructions executable by a processor to transmit a retransmission grant prior to expiration of an expiration time of an uplink transport block, receive an indication of the expiration time of the uplink transport block, identify a failure to successfully receive the uplink transport block prior to the indicated expiration time, and terminate a retransmission grant process associated with the uplink transport block based on the identified failure.

Some examples of the method, apparatuses, and non-transitory computer-readable medium described herein may further include operations, features, means, or instructions for determining the expiration time of the uplink transport block based on the indication and where the expiration time may be determined with respect to one or more of: an ending symbol of a SR message, or an end of a physical uplink shared channel transmission containing the uplink transport block.

Some examples of the method, apparatuses, and non-transitory computer-readable medium described herein may further include operations, features, means, or instructions for determining a value of a NDI associated with the uplink transport block and where the expiration time may be determined further based on the value of the NDI. Some examples of the method, apparatuses, and non-transitory computer-readable medium described herein may further include operations, features, means, or instructions for determining whether to transmit a retransmission grant for the uplink transport block based on the expiration time.

In some examples of the method, apparatuses, and non-transitory computer-readable medium described herein, terminating the retransmission grant process associated with the uplink transport block may include operations, features, means, or instructions for refraining from sending a retransmission grant for the uplink transport block based on the expiration time. Some examples of the method, apparatuses, and non-transitory computer-readable medium described herein may further include operations, features, means, or instructions for transmitting a first retransmission grant for the uplink transport block.

Some examples of the method, apparatuses, and non-transitory computer-readable medium described herein may further include operations, features, means, or instructions for determining a retransmission deadline for the uplink transport block. In some examples of the method, apparatuses, and non-transitory computer-readable medium described herein, the indication of the expiration time includes an index to a table of standard expiration time values.

In some examples of the method, apparatuses, and non-transitory computer-readable medium described herein, the indication of the expiration time may be received as a multi-bit SR. In some examples of the method, apparatuses, and non-transitory computer-readable medium described herein, the indication of the expiration time may be received over a grant-free uplink data channel.

In some examples of the method, apparatuses, and non-transitory computer-readable medium described herein, the indication of the expiration time may be received in a BSR message.

DETAILED DESCRIPTION

A receiving device may receive an expiration indication informing the receiving device a time at which a transport block expires. The expiration indication may provide information regarding a start time for the expiration time. In some cases, the expiration time may begin at an end of a shared channel carrying the transport block. In other cases, the expiration time may begin at the end of a scheduled hybrid automatic repeat request (HARQ) feedback message. In other cases, the expiration time may begin at the end of a combination of a scheduled HARQ feedback message and a processing time for the transmitting device. In yet other cases, the expiration time may begin at the end of a service request (SR) message.

The receiving device may also determine a retransmission deadline for the transport block. A retransmission deadline may inform a receiving device of a time period in which to transmit a subsequent retransmission message. The receiving device may initially fail to receive the transport block. The receiving device may transmit a retransmission request, such as a non-acknowledgement (NACK) or a retransmission grant, during scheduled retransmission resources. If the receiving device continues to fail in receiving the transport block, the receiving device may transmit a second retransmission request upon expiration of the retransmission deadline.

After the expiration time expires without the receiving device successfully receiving the transport block, the communicating devices may determine that the transport block has also expired. If the transport block is for a downlink communication, the receiving device may empty a HARQ buffer associated with the transport block. If the transport block is in the uplink, the receiving device may refrain from sending a retransmission grant to the transmitting device. Thus, the techniques described herein may allow for greater coordination between a scheduling and non-scheduling device for communications with low latency requirements.

Aspects of the disclosure are initially described in the context of wireless communications systems. Aspects of the disclosure are then illustrated in the context of communication timelines and process flows. Aspects of the disclosure are further illustrated by and described with reference to apparatus diagrams, system diagrams, and flowcharts that relate to expiration periods for low latency communications.

Figure 1:
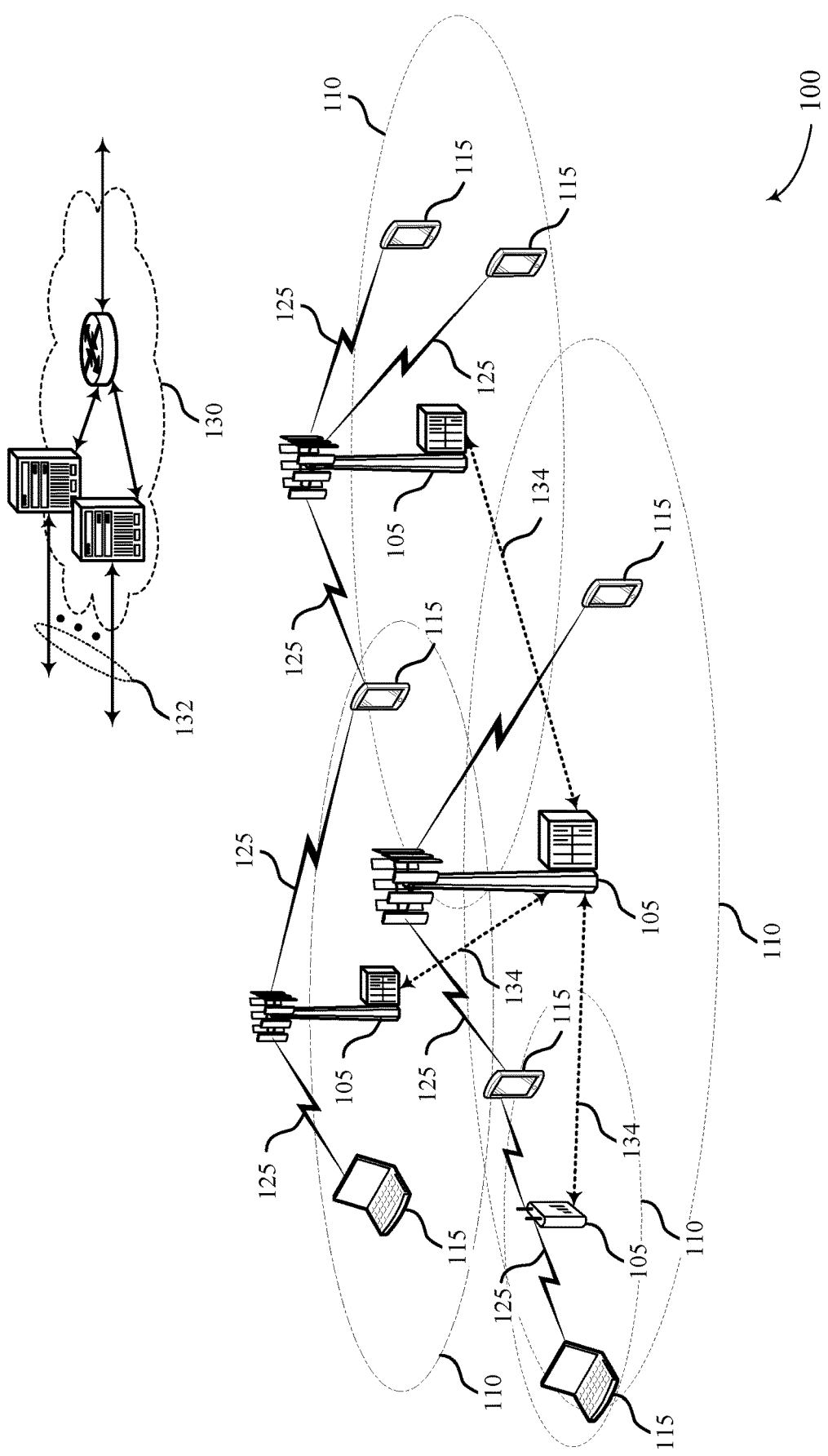
FIG. 1 illustrates an example of a wireless communications system that supports expiration periods for low latency communications in accordance with aspects of the present disclosure.

FIG. 1 illustrates an example of a wireless communications system 100 that supports expiration periods for low latency communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may receive a downlink control information message from a base station 105 scheduling the transmission of a downlink transport block. The downlink control information message may also include an indication of an expiration time for the transport block. If the expiration time expires prior to reception of the transport block, the UE 115 and base station 105 may determine that the downlink transport block has expired (i.e., become useless). The UE 115 may then terminate a HARQ process associated with the downlink transport block (e.g., flushing or emptying a HARQ buffer).

Conversely, the UE 115 may have an uplink transport block to transmit to the base station. The UE 115 may determine an expiration time for the uplink transport block, and may transmit an indication of the expiration time to the base station 105. The base station 105 may wait for reception of the uplink transport block until the expiration period expires. If the uplink transport block is not received prior to expiration of the expiration time, the base station 105 may determine that the uplink transport block is expired. The base station may then refrain from transmitting a retransmission grant to the UE 115 for the uplink transport block.

Figure 2A:
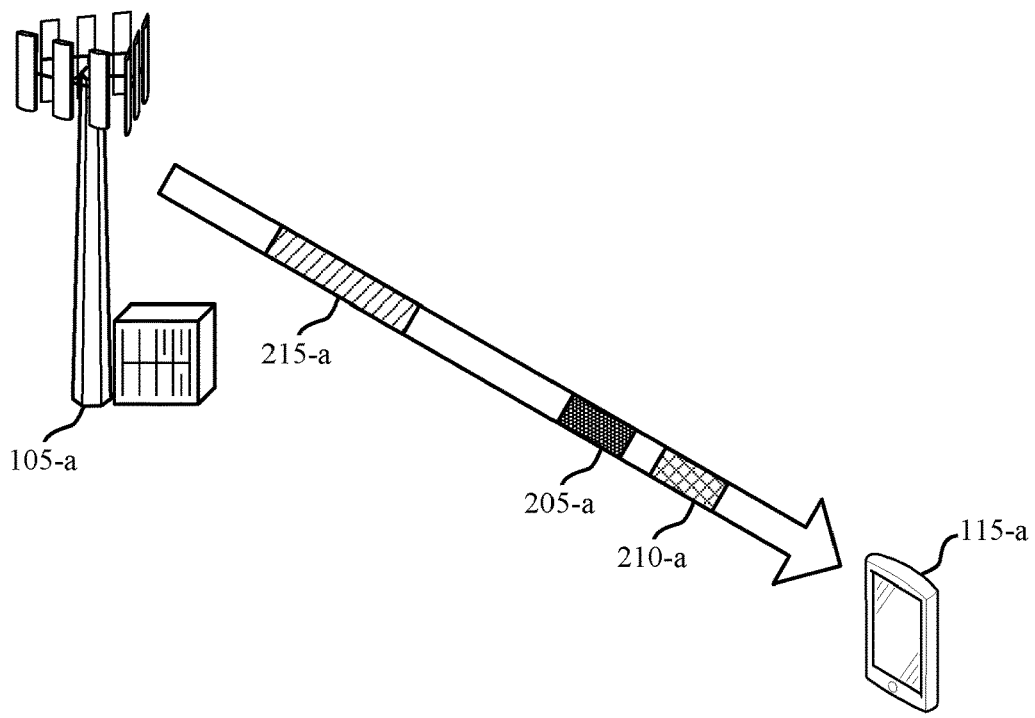
FIGS. 2A and 2B illustrate examples of wireless communications systems that support expiration periods for low latency communications in accordance with aspects of the present disclosure.

FIG. 2A illustrates an example of a wireless communications system 200-a that supports expiration periods for low latency communications in accordance with aspects of the present disclosure. In some examples, wireless communications system 200-a may implement aspects of wireless communication system 100. Wireless communications system 200-a may include a base station 105-a and a UE 115-a, which may be examples of corresponding base stations 105 and UEs 115 as described above with reference to FIG. 1. In some cases, base station 105-a may transmit communications to UE 115-a, such as a downlink grant 205-a, an expiration time indication 210-a, and a downlink transport block 215-a.

Base station 105-a may determine that downlink communications are to be sent to UE 115-a. The downlink communications may have low latency requirements, such as URLLC. Low latency communications may require a shorter packet delivery time than conventional communications (e.g., within 1 ms).

However, this shorter packet delivery time may cause issues with communication coordination between base station 105-a and UE 115-a. For example, base station 105-a may identify delay issues associated with delivering downlink transport block 215-a that are unknown to the UE 115-a (e.g., a scheduling delay for downlink transport block 215-a). These delay issues may cause UE 115-a to fail to receive downlink transport block 215-a at the scheduled time. These delay issues are further exacerbated for low latency communications, as a low latency communication may be rendered useless if low latency requirements are not met.

Base station 105-a may determine an expiration time for downlink transport block 215-a. The expiration time may be a time in which downlink transport block 215-a expires (e.g., is rendered useless). If the UE 115-a fails to receive downlink transport block 215-a prior to the expiration time expiring, both base station 105-a and UE 115-a may halt any attempts at receiving or transmitting downlink transport block 215-a.

Base station 105-a may inform UE 115-a of the expiration time for downlink transport block 215-a. Base station 105-a may configure a downlink control information (DCI) message to indicate the expiration time. Expiration time indication 210-a may be paired with a downlink grant 205-a scheduling downlink transport block 215-a for communication (e.g., over PDSCH).

Expiration time indication 210-a may provide information related to a start time for the expiration time of downlink transport block 215-a. For example, expiration time indication 210-a may provide information corresponding to a starting time for the expiration time (e.g., when the expiration time begins). In some cases, the expiration time may begin at an end of a scheduled HARQ feedback message associated with downlink transport block 215-a. In other cases, the expiration time may begin at the end of the downlink channel scheduled to carry downlink transport block 215-a (e.g., PDSCH). In other cases, the expiration time may begin at a combination of an end of a scheduled HARQ feedback associated with downlink transport block 215-a, and a processing time of base station 105-a.

In some examples, base station 105-a may configure the expiration time indication 210-a to indicate whether HARQ feedback is further required. For example, expiration time indication 210-a may be provided a null value (e.g., indicate a start time of "0"). Based on the null value, UE 115-a may determine that HARQ feedback is no longer required for downlink transport block 215-a (e.g., if a HARQ feedback message is scheduled to transmit after the expiration time expires or if a HARQ feedback message would be received after the expiration time expires).

The start time for the expiration time may change depending on whether downlink transport block 215-a is a transmission or retransmission. For example, base station 105-a may configure the DCI message with a new data indicator (NDI). The NDI may indicate whether downlink transport block 215-a is a transmission or a retransmission of scheduled data. If the NDI indicates that downlink transport block 215-a is a new transmission, UE 115-a may rely on a table of values to interpret expiration indication 210-a. If the NDI indicates that downlink transport block 215-a is a retransmission, UE 115-a may rely on a different table of values to interpret expiration indication 210-a. The tables of values may be provided to UE 115-a by a base station 105 of system 200 (e.g., via RRC signaling). Furthermore, UE 115-a may interpret expiration indication 210-a based on at least one parameter of the DCI message or at least one parameter of a downlink control channel carrying the DCI message.

In some cases, a transport block (e.g., transport block 215-a) has an expiration time that allows at least one more transmission/re-transmission. In other words, expiration time is configured such that one more transmission (in addition to the present) may be allowed. This may be referred to as a "not expiring soon" expiration time. In other cases, the expiration time may indicate a "last-chance," such that there may be no time for retransmission (after the current transmission) of the transport block 215-a. The "not expiring soon" expiration time and the "last chance" expiration time may be indicated via a table with two entries, one for each of "not expiring soon" and "last chance." As noted, the UE 115-a may determine whether to send HARQ feedback based on the expiration time. In cases where the expiration time is a "last chance" expiration time, then the 115-a may determine to not transmit a HARQ feedback (e.g., HARQ-ACK or HARQ-NACK) based on the last chance expiration time. In other words, the UE 115-a determines to not transmit the HARQ feedback because the expiration time indicates that there is not time for retransmission of the associated transport block. Further, the UE 115-a may determine to not transmit the HARQ feedback regardless of whether the transport block 215-a is decoded successfully or not because the expiration time is expired or expiring.

UE 115-a may also determine a retransmission deadline associated with downlink transport block 215-a. The retransmission deadline may be a deadline for retransmitting a retransmission request for downlink transport block 215-a. For example, UE 115-a may fail to receive downlink transport block 215-a from base station 105-a. UE 115-a may transmit a HARQ feedback message (e.g., a NACK) during scheduled HARQ feedback resources. If UE 115-a fails to receive a downlink retransmission grant for downlink transport block 215-a upon expiration of the retransmission deadline, UE 115-a may transmit a second HARQ feedback message (e.g., a second NACK) to base station 105-a.

Information indicating the retransmission deadline may be provided by entities in the system 200. In some cases, UE 115-a may receive a retransmission deadline indication from a base station 105 (e.g., via RRC signaling) In these cases, the retransmission deadline may be a fixed value. In other cases, UE 115-a may determine the retransmission deadline from downlink grant 205-a. For example, UE 115-a may determine the length of a retransmission of downlink transport block 215-a (e.g., over PDSCH) may be the same as the length for the previous transmission of downlink transport block 215-a (e.g., over PDSCH). UE 115-a may determine the retransmission deadline based on the determined lengths, as well as from other information (e.g., a processing time for base station 105-a and/or a preconfigured gap period).

A second HARQ-ACK feedback message may have different characteristics than the original HARQ-ACK feedback message. These different characteristics may ensure that the second HARQ-ACK has a higher reliability than the original HARQ-ACK feedback message. In some cases, different channel resources may be used for the second HARQ-ACK feedback message as compared to the first HARQ-ACK feedback message (e.g., different resource groups in PUCCH). Additionally, or alternatively, the second HARQ-ACK feedback message may be transmitted with a higher transmit power compared to the first HARQ-ACK feedback message (e.g., +3 dB). Additionally, or alternatively, the second HARQ-ACK feedback message may be transmitted as one bit, and may not be multiplexed with other UCI. Additionally, or alternatively, the second HARQ-ACK feedback message may have a higher priority over other UCI.

UE 115-a may fail to receive downlink transport block 215-a prior to expiration of the expiration time. Based on the expiration, UE 115-a may empty (e.g., flush) a HARQ buffer associated with downlink transport block 215-a. Additionally, UE 115-a may send a failed reception indicator to upper layers of UE 115-a. The failed reception indicator may be used in part to trigger an event, such a radio link failure event. For example, a radio link failure event may be triggered when the upper layers of UE 115-a received a consecutive number of failed reception indications within a given time interval.

Figure 2B:
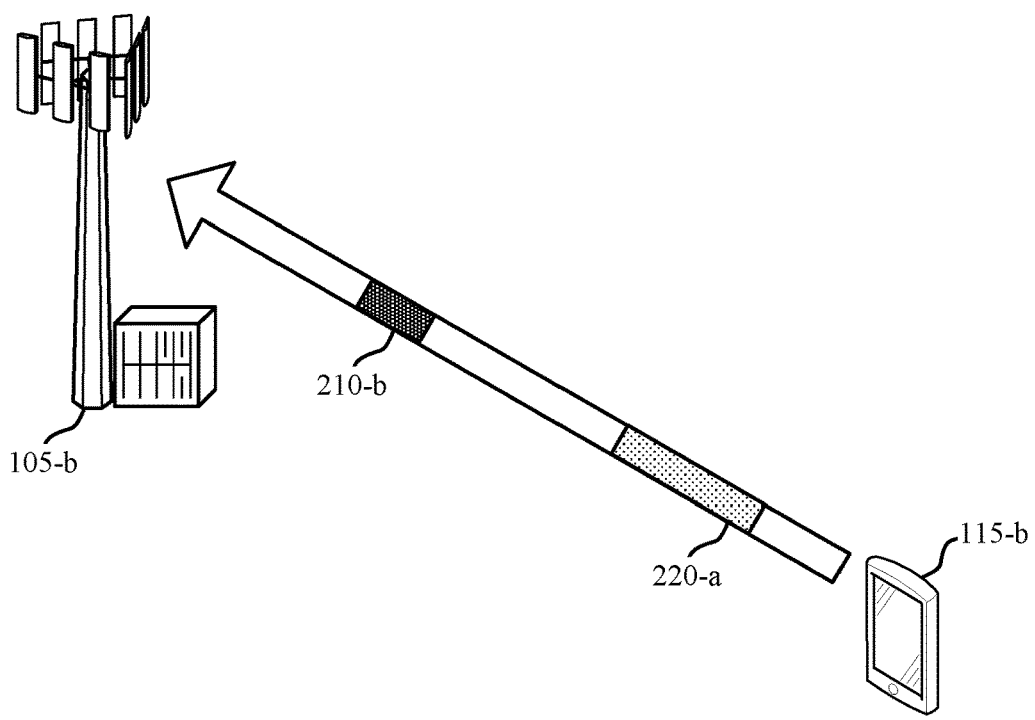

FIG. 2B illustrates an example of a wireless communications system 200-b that supports expiration periods for low latency communications in accordance with aspects of the present disclosure.

In some examples, wireless communications system 200-b may implement aspects of wireless communications systems 100 and 200-a. Wireless communications system 200-b may include a base station 105-b and a UE 115-b, which may be examples of corresponding base stations 105 and UEs 115 as described above with reference to FIG. 1. In some cases, UE 115-b may transmit communications to base station 105-b, such as expiration time indication 210-b and an uplink transport block 220-a.

UE 115-b may determine that uplink communications are to be sent to base station 105-b. The uplink communications may have low latency requirements, such as URLLC. However, as discussed in further detail with reference to FIG. 2A, UE 115-b may experience scheduling delays, which may delay the transmission and reception of uplink transport block 220. Furthermore, base station 105-b, as the non-scheduling device, may not have knowledge of these scheduling delays.

UE 115-b may determine an expiration time for uplink transport block 220-a. The expiration time may be a time in which uplink transport block 220-a expires (e.g., is rendered useless). If base station 105-b fails to receive uplink transport block 220-a prior to the expiration time expiring, both base station 105-b and UE 115-b may halt any attempts at receiving or transmitting uplink transport block 220-a.

UE 115-b may inform base station 105-b of the expiration time for uplink transport block 220-a. UE 115-b may configure an uplink control information UCI message to indicate the expiration time.

Expiration time indication 210-b may provide information related to a start time for the expiration time of the uplink transport block 220-a. In some cases, the expiration time may begin at a SR message transmitted to base station 105-b. In other cases, the expiration time may begin at an end of a grant free (GF) uplink shared channel (e.g., GF PUSCH).

In some examples, UE 115-b may configure the expiration time indication 210-b to indicate whether retransmission grants are further required. For example, expiration time indication 210-b may be provided a null value (e.g., indicate a start time of "0"). Based on the null value, base station 105-b may determine that retransmission grants are no longer required for the uplink transport block 220-a (e.g., if a retransmission grant would be received after the expiration time expires).

Base station 105-b may also determine a retransmission deadline associated with uplink transport block 220-a. The retransmission deadline may be a deadline for retransmitting a retransmission grant for uplink transport block 220-a. For example, base station 105-b may fail to receive uplink transport block 220-a from UE 115-b. Base station 105-b may transmit a retransmission grant during scheduled grant resources (e.g., over PDCCH). If base station 105-b fails to receive uplink transport block 220 upon expiration of the retransmission deadline, base station 105-b may transmit a second retransmission grant to UE 115-b.

In some cases, base station 105-b determine a resource allocation for an uplink retransmission based on the indicated expiration time. For example, base station 105-b may determine the expiration time for uplink transport block 220-a to be a small value. In this example, there may be time for only one retransmission from UE 115-b. Thus, base station 105-b may schedule a larger resource pool for the uplink retransmission to increase the likelihood of successful reception. In another example, base station 105-b may determine the expiration time value to be a large value. Base station 105-b may determine that there is sufficient time for multiple retransmissions from UE 115-b. In this example, base station 105-b may allocate small amount of resources for a first retransmission and a larger amount of resources for another retransmission (e.g., when the first retransmission fails).

Figure 3A:
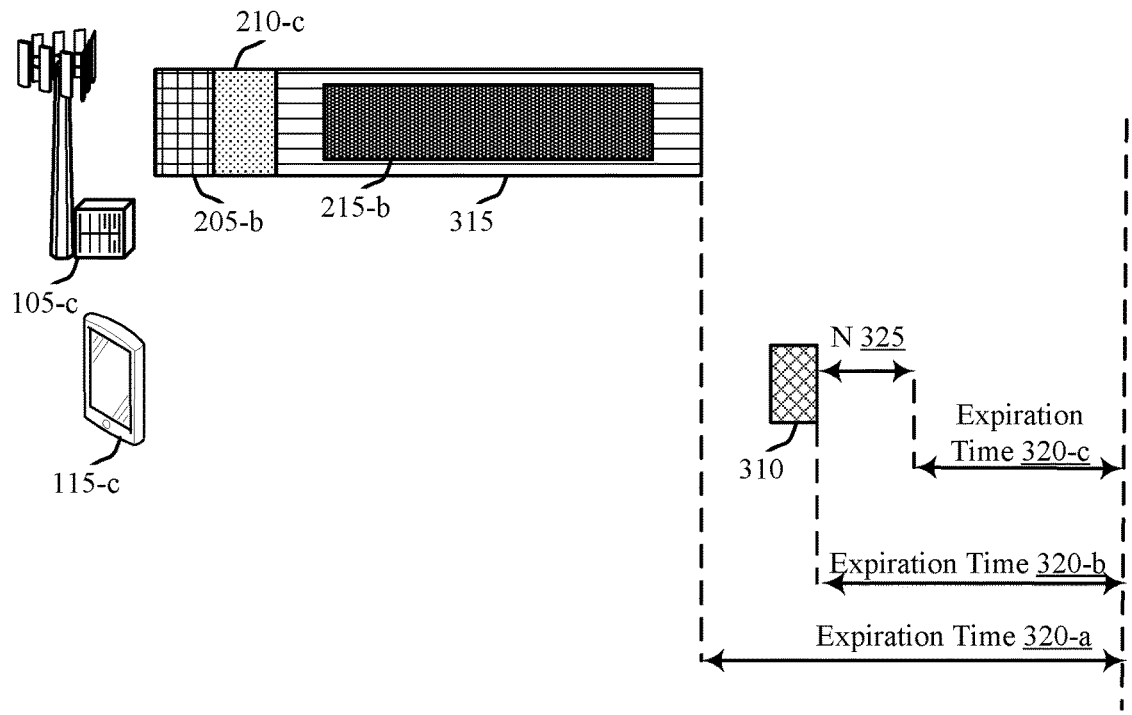
FIGS. 3A and 3B illustrates an example of communication timelines that support expiration periods for low latency communications in accordance with aspects of the present disclosure.

FIG. 3A illustrates an example of a communication timeline 300-a that supports expiration periods for low latency communications in accordance with aspects of the present disclosure. In some examples, communication timeline 300-a may implement aspects of wireless communication systems 100, 200-a, or 200-b. Communication timeline 300-a may be implemented by a base station 105-c and a UE 115-c, which may be examples of corresponding base stations 105 and UEs 115 as described above with reference to FIGS. 1, 2A, and 2B. In some cases, base station 105-c may transmit communications to UE 115-c, such as a DCI message, a downlink grant 205-b, an expiration time indication 210-c, and a downlink transport block 215-b carried over physical downlink shared channel (PDSCH) 315. Additionally, UE 115-c may transmit communications to base station 105-c, such as a HARQ-ACK 310. Further, communication timeline may provide various examples of expiration periods 320, which may be examples of expirations periods discussed with reference to FIGS. 2A and 2B.

Base station 105-c may determine an expiration time for downlink transport block 215-b. The expiration time may be a time in which downlink transport block 215-b expires. If UE 115-b fails to receive downlink transport block 215-b prior to the expiration time expiring, both base station 105-c and UE 115-c may halt any attempts at receiving or transmitting downlink transport block 215-b.

Base station 105-c may inform UE 115-c of the expiration time for downlink transport block 215-b. Base station 105-c may configure a DCI message to indicate the expiration time. For example, expiration time indication 210-c may be paired with downlink grant 205-b scheduling downlink transport block 215-b.

The expiration time for downlink transport block 215-b may differ based on the starting time indicated in the expiration time indication 210-c. For example, expiration time indication 210-c may indicate the start time at the end of PDSCH 315 carrying downlink transport block 215-b. As such, the start time at the end of PDSCH 315 may result in expiration period 320-a as the expiration period for downlink transport block 215-b.

In another example, expiration time indication 210-c may indicate the start time at the end of a scheduled HARQ feedback message resource. UE 115-c may determine a failed reception for downlink transport block 215-b. UE 115-c may transmit a HARQ-ACK 310 to base station 105-c indicating a failed reception of downlink transport block 215-b. The end of HARQ-ACK 310 may be the start time for the expiration period for downlink transport block 215-b. As such, the start time at the end of HARQ-ACK 310 may result in expiration period 320-b as the expiration period for downlink transport block 215-b.

In yet another example, expiration time indication 210-c may indicate the start time of a combination of the end of a scheduled HARQ feedback message resource and a processing time for base station 105-c. UE 115-c may determine a failed reception for downlink transport block 215-b. UE 115-c may transmit a HARQ-ACK 310 to base station 105-c indicating a failed reception of downlink transport block 215-b. The end of HARQ-ACK 310 may be the start time for the expiration period for downlink transport block 215-b in addition to a processing time for base station 105-c (e.g., N 325). As such, the start time at the combination of the end of HARQ-ACK 310 and a processing time for base station 105-c may result in expiration period 320-c as the expiration period for downlink transport block 215-b.

Figure 3B:
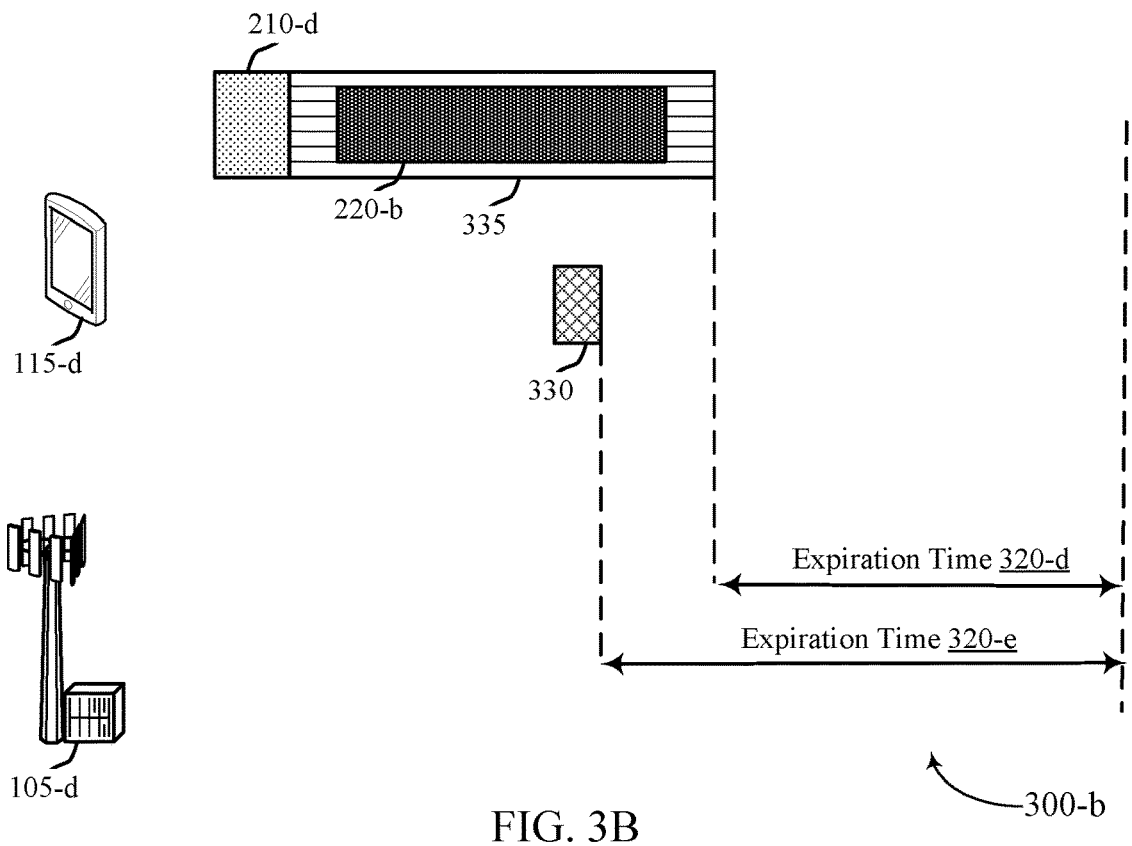

FIG. 3B illustrates an example of a communication timeline 300-b that supports expiration periods for low latency communications in accordance with aspects of the present disclosure. In some examples, communication timeline 300-a may implement aspects of wireless communications systems 100, 200-a, and 200-b. Communication timeline 300-b may be implemented by a base station 105-d and a UE 115-d, which may be examples of corresponding base stations 105 and UEs 115 as described above with reference to FIGS. 1, 2A, and 2B. In some cases, UE 115-d may transmit communications to base station 105-d, such as an expiration time indication 210-d, a SR message 330, and an uplink transport block 220-b carried over GF PUSCH 335. Further, communication timeline 300-b may provide various examples of expiration periods 320, which may be examples of expiration periods discussed with reference to FIGS. 2A and 2B.

UE 115-d may determine an expiration time for uplink transport block 220-b. The expiration time may be a time in which the uplink transport block 220-b expires. If base station 105-d fails to receive uplink transport block 220-b prior to the expiration time expiring, both base station 105-*d* and UE 115-*d* may halt any attempts at receiving or transmitting uplink transport block 220-*b*.

UE 115-*d* may inform base station 105-*d* of the expiration time for uplink transport block 220-*b*. UE 115-*d* may configure expiration time indication 210-*d* and may transmit expiration time indication 210-*d* to base station 105-*d*.

The expiration time for uplink transport block 220-*b* may differ based on the starting time indicated in the expiration time indication 210-*d*. For example, expiration time indication 210-*d* may indicate the start time at the end of GF PUSCH 335 carrying uplink transport block 220-*b*. As such, the start time at the end of GF PUSCH 335 may result in expiration period 320-*d* as the expiration period for uplink transport block 220-*b*.

In another example, expiration time indication 210-*d* may indicate the start time at the end of a SR message 330. The end of SR 330, which may be associated with uplink transport block 220-*b*, may be the start time for the expiration period for uplink transport block 220-*b*. As such, the start time at the end of SR 330 may result in expiration period 320-*e* as the expiration period for uplink transport block 220-*b*.

Figure 4:
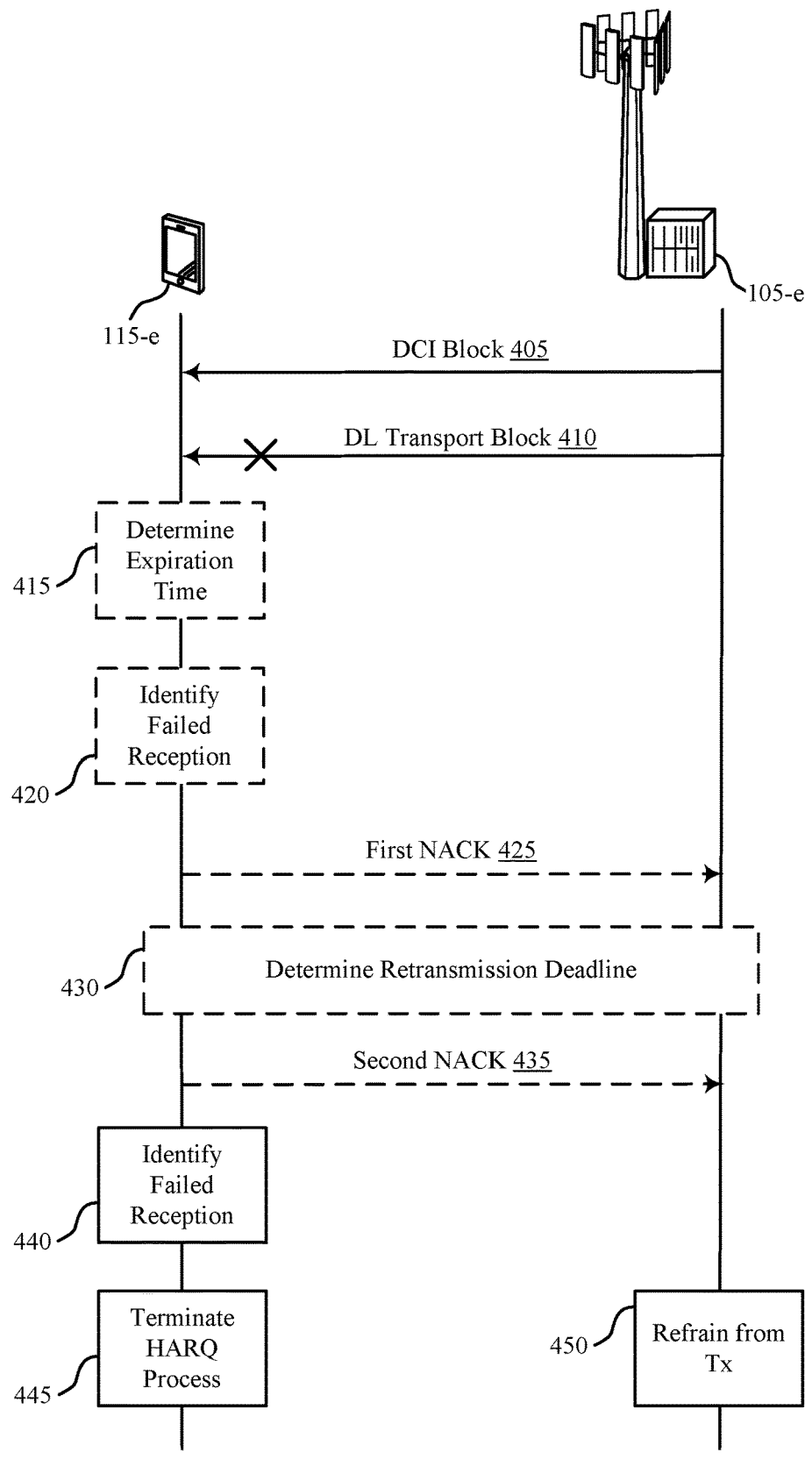
FIGS. 4 and 5 illustrate examples of process flows that support expiration periods for low latency communications in accordance with aspects of the present disclosure.

FIG. 4 illustrates an example of a process flow 400 that supports expiration periods for low latency communications in accordance with aspects of the present disclosure. In some examples, process flow 400 may implement aspects of wireless communication system 100. In some examples, process flow 400 may implement aspects of wireless communications systems 100 and/or 200. Process flow 400 may include a base station 105-*e* and a UE 115-*e*, which may be examples of corresponding base stations 105 and UEs 115 as described above with reference to FIGS. 1-3.

At 405, base station 105-*e* may determine an expiration time of a downlink transport block. At 410, base station 105-*e* may transmit, and UE 115-*e* may receive, a DCI block comprising a downlink grant for the downlink transport block and an indication of the expiration time of the downlink transport block. The UE 115-*e* may monitor a wireless channel for the downlink transport block according to the downlink grant of the DCI block.

Optionally, at 415, UE 115-*e* may determine the expiration time of the downlink transport block based at least in part on the indication. In some cases, the expiration time is determined with respect to one or more of: an ending symbol of a scheduled HARQ-acknowledgment (HARQ-ACK) feedback for the downlink transport block, an end of a physical downlink shared channel transmission containing the downlink transport block, or an end of a base station processing time following a scheduled HARQ-ACK feedback for the downlink transport block.

Optionally, at 420, UE 115-*e* may identify a failure to successfully decode the downlink transport block. Optionally, at 425, UE 115-*e* may transmit, and base station 105-*e* may receive, a first NACK for the downlink transport block. Optionally, at 430, UE 115-*e*, base station 105-*e*, or both, may determine a retransmission deadline for the downlink transport block based at least in part on the expiration time. Optionally, at 435, UE 115-*e* may transmit, and base station 105-*e* may receive, a second NACK for the downlink transport block based at least in part on an expiration of the retransmission deadline and in part on determining that a downlink retransmission scheduling grant was not received before the expiration of the retransmission deadline.

At 440, UE 115-*e* may identify a failure to successfully receive the downlink transport block prior to the indicated expiration time. At 445, UE 115-*e* may terminate a HARQ process associated with the downlink transport block based at least in part on the identified failure or the indicated expiration time. Additionally, base station 105-*e* may refrain from retransmitting the downlink transport block based at least in part on the expiration time. At 450, base station may refrain from transmitting the downlink transport block based on the expiration period expiring.

Figure 5:
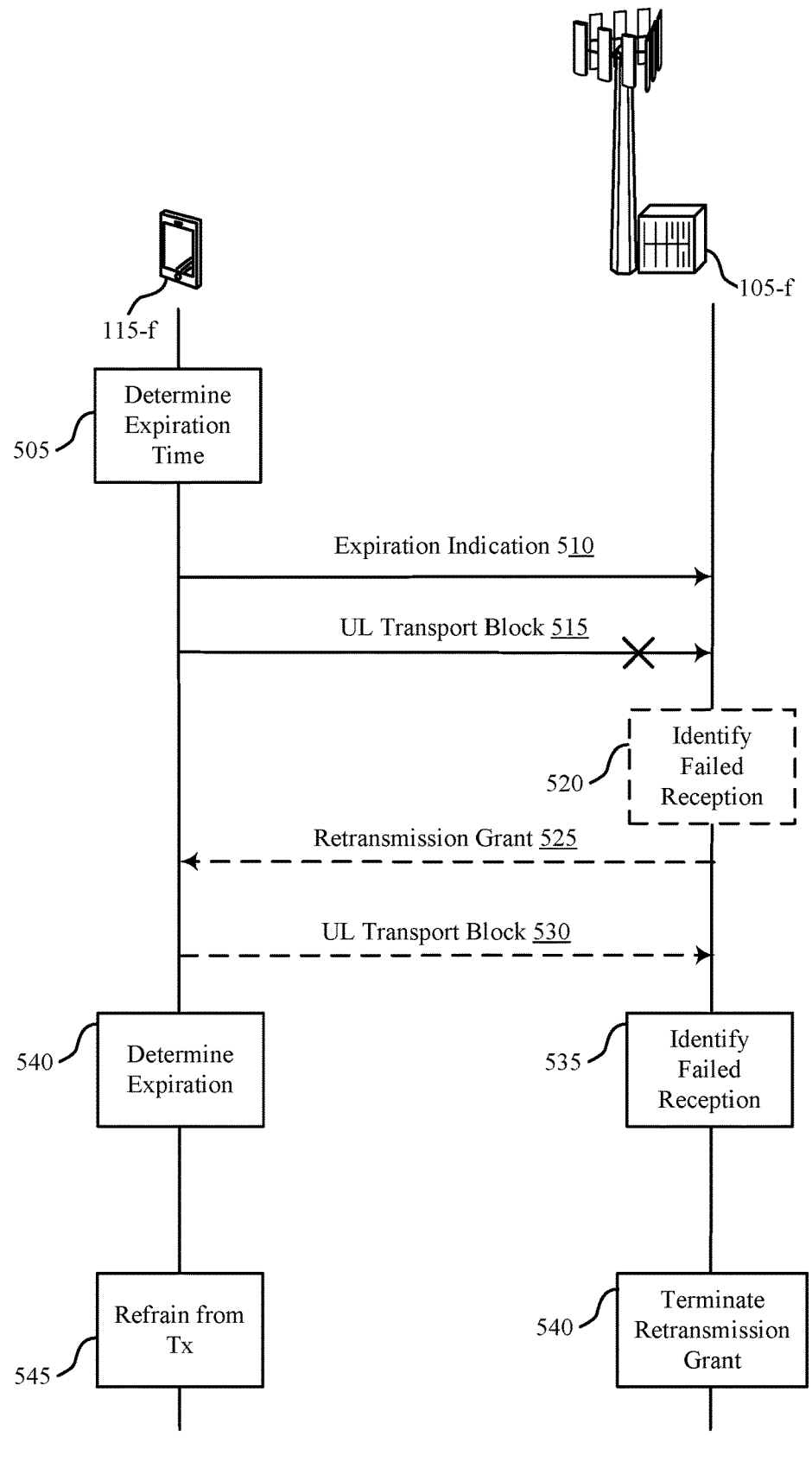

FIG. 5 illustrates an example of a process flow 500 that supports expiration periods for low latency communications in accordance with aspects of the present disclosure. In some examples, process flow 500 may implement aspects of wireless communication system 100. In some examples, process flow 500 may implement aspects of wireless communications systems 100 and/or 200. Process flow 500 may include a base station 105-*f* and a UE 115-*f*, which may be examples of corresponding base stations 105 and UEs 115 as described above with reference to FIGS. 1-3.

At 505, UE 115-*f* may determine an expiration time of an uplink transport block. At 510, UE 115-*f* may transmit, and base station 105-*f* may receive, an indication of the expiration time of the uplink transport block. At 515, UE 115-*f* may transmit the uplink transport block.

Optionally, at 520, base station 105-*f* may identify a failed reception of the uplink transport block. Optionally, at 525, base station 105-*f* may transmit, and UE 115-*f* may receive, an uplink retransmission grant for the uplink transport block. Optionally, at 530, UE 115-*f* may transmit at least a portion of the uplink transport block based on the uplink retransmission grant and prior to the expiration of the indicated expiration time.

At 535, base station 105-*f* may identify a failure to successfully receive the uplink transport block prior to the indicated expiration time. At 540, UE 115-*f* may determine an expiration of the indicated expiration time. At 540, base station 105-*f* may terminate a retransmission grant process associated with the uplink transport block based at least in part on the identified failure. At 545, UE 115-*f* may refrain from retransmitting the uplink transport block based at least in part on the determined expiration.

Figure 6:
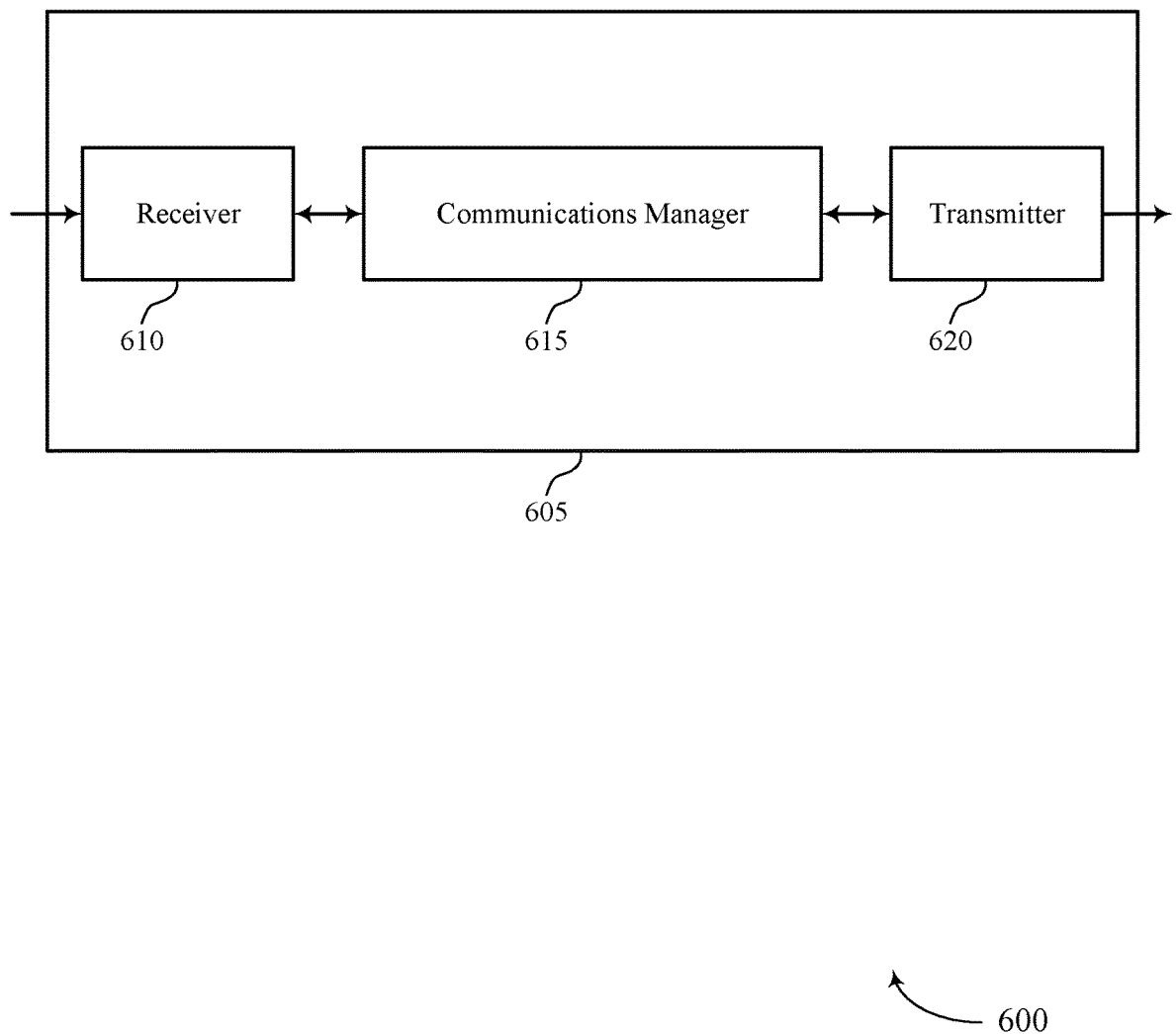
FIGS. 6 and 7 show block diagrams of devices that support expiration periods for low latency communications in accordance with aspects of the present disclosure.

FIG. 6 shows a block diagram 600 of a device 605 that supports expiration periods for low latency communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to expiration periods for low latency communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a DCI block including a downlink grant for a downlink transport block and an indication of an expiration time of the downlink transport block, monitor a wireless channel for the downlink transport block according to the downlink grant of the DCI block, and terminate a HARQ process associated with the downlink transport block based on the identified expiration time. The communications manager 615 may also determine an expiration time of an uplink transport block, refrain from retransmitting the uplink transport block based on the determined expiration, transmit an indication of the expiration time of an uplink transport block, transmit the uplink transport block, and determine an expiration of the indicated expiration time. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

One implementation is receiving a downlink control information (DCI) block comprising a downlink grant for a downlink transport block and an indication of an expiration time of the downlink transport block, identifying a failure to successfully receive the downlink transport block prior to the indicated expiration time, and terminating a hybrid automatic repeat request (HARD) process associated with the downlink transport block based at least in part on the identified failure. This implementation to realize one or more potential advantages. For example, this implementation may allow a UE 115 to save power and increase battery life by avoiding having to perform HARQ process procedures on a transport block that is expiring. This may also improve quality and reliability of service at the UE 115, as latency may be improved due to reduced retransmissions of transport blocks as well as HARQ feedbacks. Further, other advantages may be realized at one or more processors of the UE 115, because the UE 115 may not need the processing resources to conduct the HARQ processes associated with an expiring transport block.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
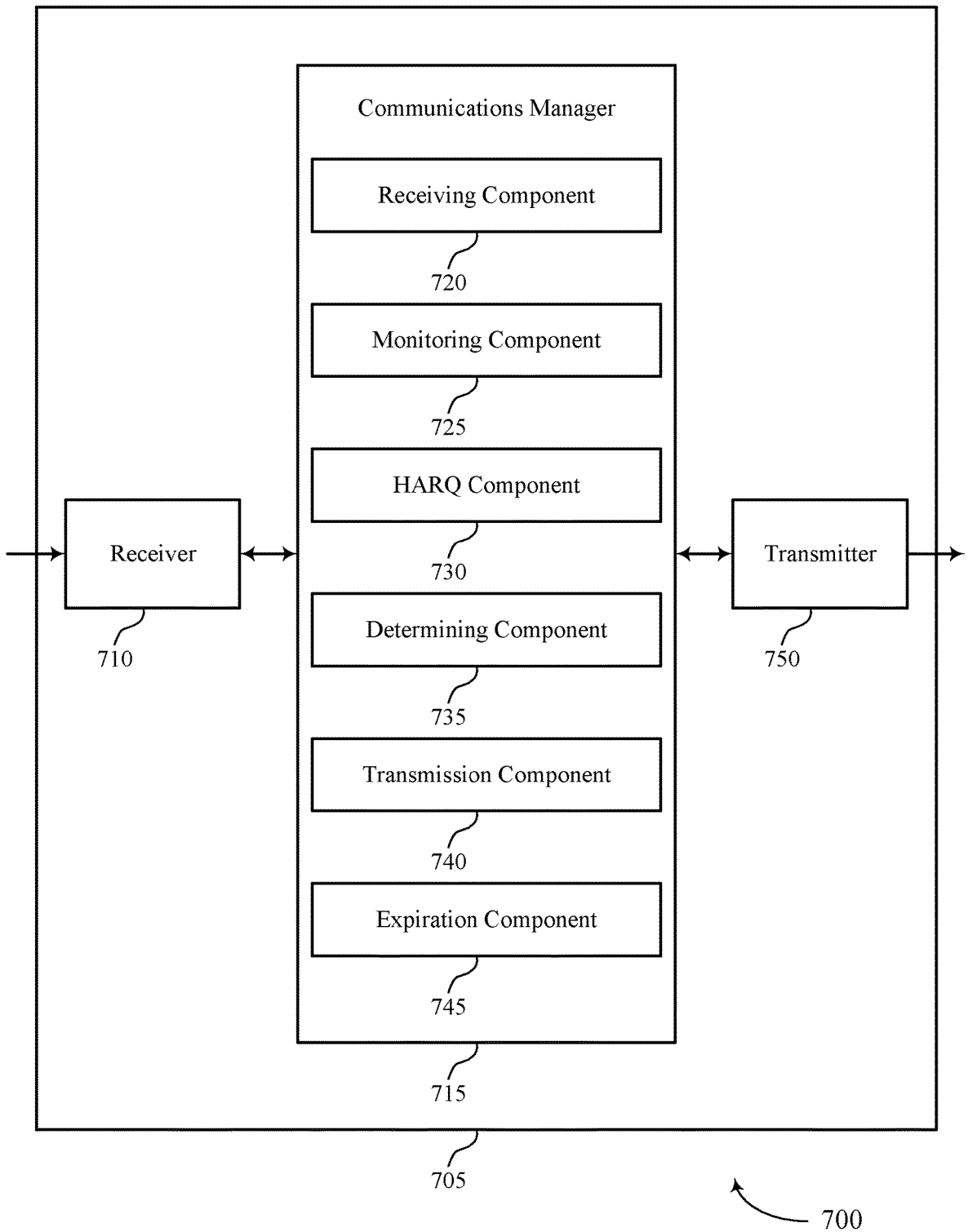

FIG. 7 shows a block diagram 700 of a device 705 that supports expiration periods for low latency communications in accordance with aspects of the present disclosure. The device 705 may be an example of aspects of a device 605 or a UE 115 as described herein. The device 705 may include a receiver 710, a communications manager 715, and a transmitter 750. The device 705 may also include a processor. Each of these components may be in communication with one another (e.g., via one or more buses).

The receiver 710 may receive information such as packets, user data, or control information associated with various information channels (e.g., control channels, data channels, and information related to expiration periods for low latency communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a receiving component 720, a monitoring component 725, a HARQ component 730, a determining component 735, a transmission component 740, and an expiration component 745. The communications manager 715 may be an example of aspects of the communications manager 910 described herein.

The receiving component 720 may receive a DCI block including a downlink grant for a downlink transport block and an indication of an expiration time of the downlink transport block. The monitoring component 725 may monitor a wireless channel for the downlink transport block according to the downlink grant of the DCI block. The HARQ component 730 may terminate a HARQ process associated with the downlink transport block based on the indicated expiration time.

The determining component 735 may determine an expiration time of an uplink transport block and refrain from retransmitting the uplink transport block based on the determined expiration. The transmission component 740 may transmit an indication of the expiration time of an uplink transport block and transmit the uplink transport block. The expiration component 745 may determine an expiration of the indicated expiration time.

The transmitter 750 may transmit signals generated by other components of the device 705. In some examples, the transmitter 750 may be collocated with a receiver 710 in a transceiver module. For example, the transmitter 750 may be an example of aspects of the transceiver 920 described with reference to FIG. 9. The transmitter 750 may utilize a single antenna or a set of antennas.

Figure 8:
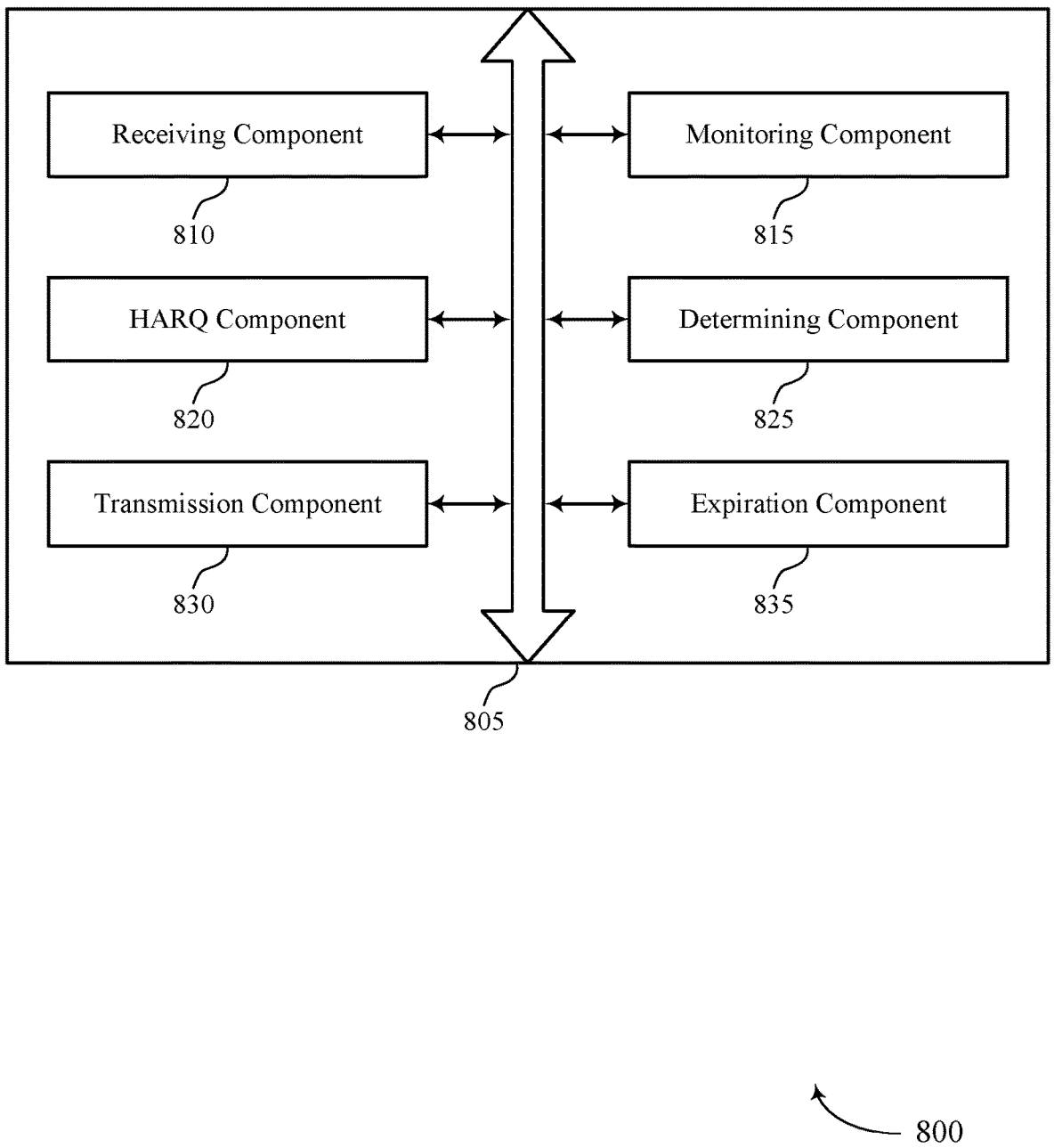
FIG. 8 shows a block diagram of a communications manager that supports expiration periods for low latency communications in accordance with aspects of the present disclosure.

FIG. 8 shows a block diagram 800 of a communications manager 805 that supports expiration periods for low latency communications in accordance with aspects of the present disclosure. The communications manager 805 may be an example of aspects of a communications manager 615, a communications manager 715, or a communications manager 910 described herein. The communications manager 805 may include a receiving component 810, a monitoring component 815, a HARQ component 820, a determining component 825, a transmission component 830, and an expiration component 835. Each of these modules may communicate, directly or indirectly, with one another (e.g., via one or more buses).

The receiving component 810 may receive a DCI block including a downlink grant for a downlink transport block and an indication of an expiration time of the downlink transport block. In some examples, the receiving component 810 may receive a configuration message indicating the retransmission deadline for the downlink transport block. In some examples, the receiving component 810 may receive an uplink retransmission grant for the uplink transport block.

The monitoring component 815 may monitor a wireless channel for the downlink transport block according to the downlink grant of the DCI block. In some examples, the monitoring component 815 may identify a failure to successfully decode the received downlink transport block prior to the indicated expiration time and send an indication of the identified failure to an upper layer of the UE.

The HARQ component 820 may terminate a HARQ process associated with the downlink transport block based on the indicated expiration time. In some examples, the HARQ component 820 may determine whether to transmit a HARQ-acknowledgement (HARQ-ACK) feedback for the downlink transport block based on the expiration time. In some examples, the HARQ component 820 may refrain from sending HARQ feedback for the downlink transport block based on the expiration time. In some examples, the HARQ component 820 may identify a failure to successfully decode the downlink transport block. In some examples, the HARQ component 820 may transmit a first non-acknowledgment (NACK) for the downlink transport block. In some examples, the HARQ component 820 may transmit a second NACK for the downlink transport block based on an expiration of the retransmission deadline. In some cases transmitting the second NACK may be further based on determining a retransmission is not received prior to expiration of the retransmission deadline. In some examples, the HARQ component 820 may empty a transmission buffer corresponding to the downlink transport block based on the identified failure or the identified expiration time. On example advantage of determining whether to transmit a HARQ feedback for the downlink transport block based on the timer and refraining from sending the HARQ feedback is that a UE 115 may conserve battery life by not sending HARQ feedback associated with an expiring transport block. Further, processing resources of the UE 115 may be saved by not wasting processing resources on a HARQ process associated with an expiring transport block.

In some cases, the first NACK and the second NACK are transmitted over different uplink control channel resources. In some cases, the second NACK is transmitted at a greater transmit power than the first NACK. In some cases, the second NACK is transmitted as a one-bit uplink control information (UCI) block. In some cases, the second NACK has a higher priority than at least one other uplink control information (UCI) transmission.

The determining component 825 may determine an expiration time of an uplink transport block. In some examples, the determining component 825 determines whether a transmission opportunity exists for a HARQ feedback for the downlink transport block prior to the indicated expiration time. In some examples, the determining component 825 may refrain from retransmitting the uplink transport block based on the determined expiration. In some examples, the determining component 825 may determine the expiration time of the downlink transport block based on the indication.

In some examples, the determining component 825 may where the expiration time is determined with respect to one or more of: an ending symbol of a scheduled HARQ-acknowledgment (HARQ-ACK) feedback for the downlink transport block, an end of a physical downlink shared channel transmission containing the downlink transport block, or an end of a base station processing time following a scheduled HARQ-ACK feedback for the downlink transport block. One example advantage of determining the expiration time with respect to one or more of: an ending symbol of a scheduled HARQ-acknowledgment (HARQ-ACK) feedback for the downlink transport block, an end of a physical downlink shared channel transmission containing the downlink transport block, or an end of a base station processing time following a scheduled HARQ-ACK feedback for the downlink transport block, is that the UE 115 may be aware of the expiration time with respect to a fixed point which may result in increased battery life by avoiding having to perform HARQ process procedures on a transport block that is expiring. Further, one or more advantages may be realized at the processor level in that the UE may turn on one or more processing units for determining the expiration time, increase a processing clock, or a similar mechanism within the UE 115. As such, when the transport block (or other timer triggering resource) is received, the processor may be ready to respond more efficiently through the reduction of a ramp up in processing power.

In some examples, the determining component 825 may determine a value of a new data indicator (NDI) associated with the DCI block. In some examples, the determining component 825 may where the expiration time is determined further based on the value of the NDI. In some examples, the determining component 825 may determine a retransmission deadline for the downlink transport block based on the expiration time. In some examples, the determining component 825 may determine a retransmission deadline for the uplink transport block. One example advantage of determining the expiration time with respect to a NDI, is that the UE 115 may be configured to determine the expiration time based on whether new data is transmitted in the transport block. Thus, resources of the UE may be efficiently used to determine the expiration time based on whether the transport block includes new data. As such, when the transport block (or other timer triggering resource) is received, the processor may be ready to respond more efficiently through the reduction of a ramp up in processing power.

In some cases, the retransmission deadline is determined based on the downlink grant. In some cases, the indication of the expiration time includes an index to a table of standard expiration time values. In some cases, the indication of the expiration time includes an index to a table of standard expiration time values. In some cases, the index is indicated by an index control filed in the DCI block. In some cases, determining component 825 may determine the index based on at least one parameter of the DCI block or at least one parameter of a downlink control channel carrying the DCI block.

The transmission component 830 may transmit an indication of the expiration time of an uplink transport block. In some examples, the transmission component 830 may transmit the uplink transport block. In some examples, the transmission component 830 may configure a new data indicator (NDI) associated with the uplink transport block to further indicate the expiration time. In some examples, the transmission component 830 may transmit the NDI. In some examples, the transmission component 830 may transmit at least a portion of the uplink transport block based on the received uplink retransmission grant and prior to the expiration of the indicated expiration time.

In some cases, the indication of the expiration time is transmitted as a multi-bit service request (SR). In some cases, the indication of the expiration time is transmitted over a grant-free uplink data channel, and where the indication of the expiration time is separately encoded with uplink data. In some cases, the indication of the expiration time is transmitted in a buffer status report (BSR) message.

The expiration component 835 may determine an expiration of the indicated expiration time. In some cases, an ending symbol of a service request (SR) message, or an end of a physical uplink shared channel transmission containing the uplink transport block.

Figure 9:
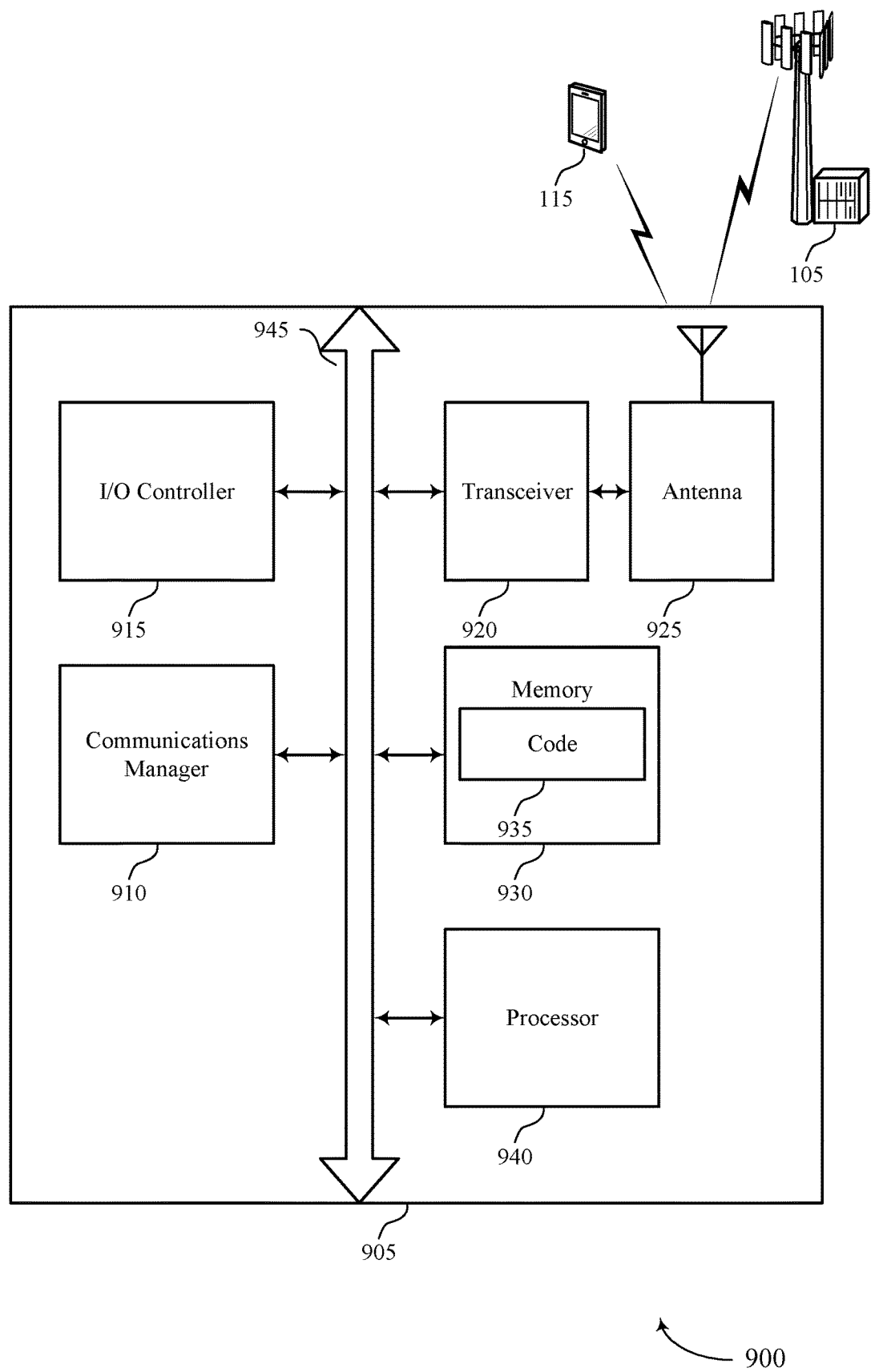
FIG. 9 shows a diagram of a system including a device that supports expiration periods for low latency communications in accordance with aspects of the present disclosure.

FIG. 9 shows a diagram of a system 900 including a device 905 that supports expiration periods for low latency communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a DCI block including a downlink grant for a downlink transport block and an indication of an expiration time of the downlink transport block, monitor a wireless channel for the downlink transport block according to the downlink grant of the DCI block, and terminate a HARQ process associated with the downlink transport block based on the indicated expiration time. The communications manager 910 may also determine an expiration time of an uplink transport block, refrain from retransmitting the uplink transport block based on the determined expiration, transmit an indication of the expiration time of an uplink transport block, transmit the uplink transport block, and determine an expiration of the indicated expiration time.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting expiration periods for low latency communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
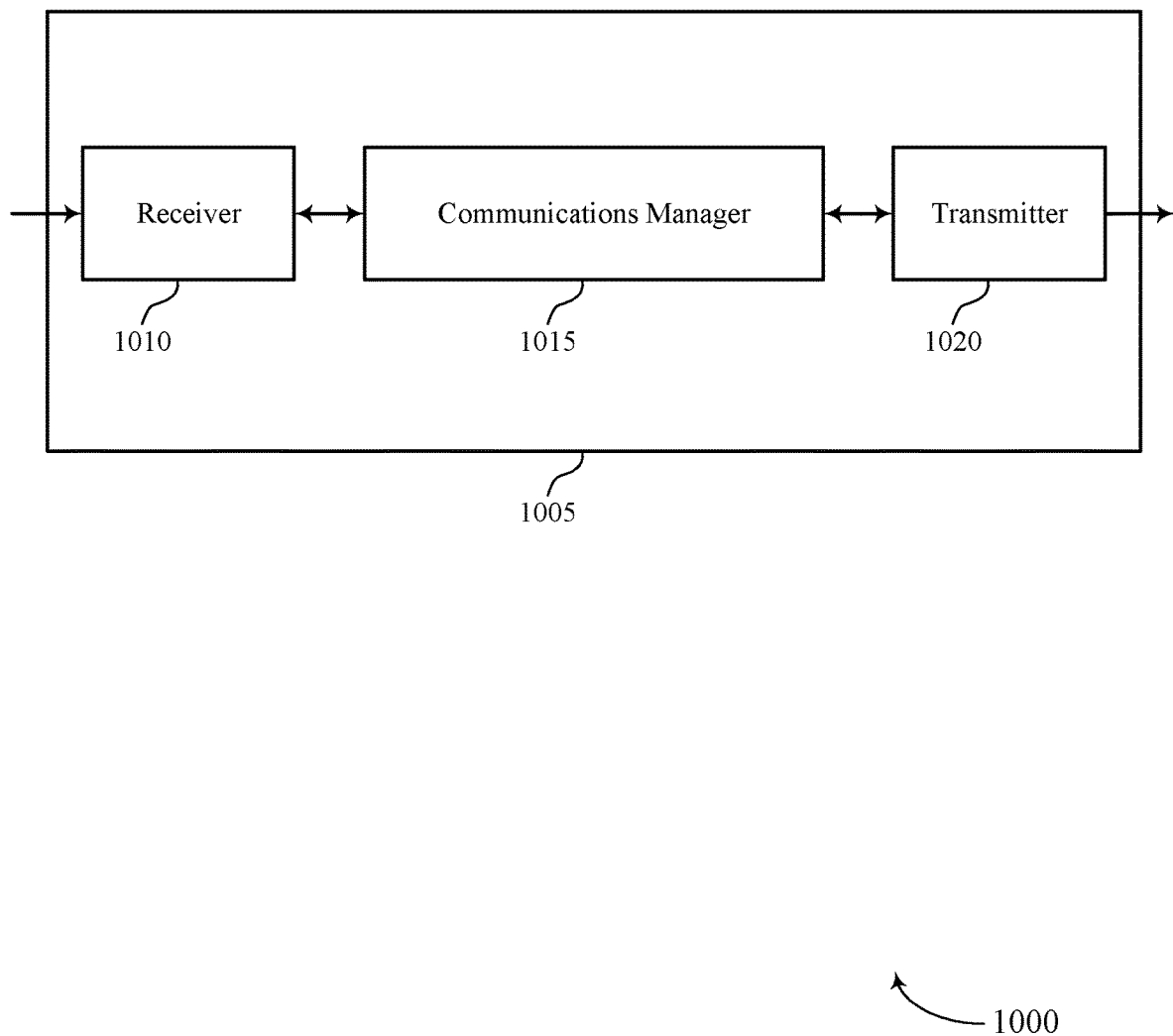
FIGS. 10 and 11 show block diagrams of devices that support expiration periods for low latency communications in accordance with aspects of the present disclosure.

FIG. 10 shows a block diagram 1000 of a device 1005 that supports expiration periods for low latency communications in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to expiration periods for low latency communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may determine an expiration time of a downlink transport block, refrain from retransmitting the downlink transport block based on the expiration time, transmit a DCI block including a downlink grant for a downlink transport block and an indication of the expiration time of the downlink transport block, and transmit the downlink transport block. The communications manager 1015 may also transmit a retransmission grant prior to expiration of an expiration time of an uplink transport block, receive an indication of the expiration time of an uplink transport block, identify a failure to successfully receive the uplink transport block prior to the indicated expiration time, and terminate a retransmission grant process associated with the uplink transport block based on the identified failure. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
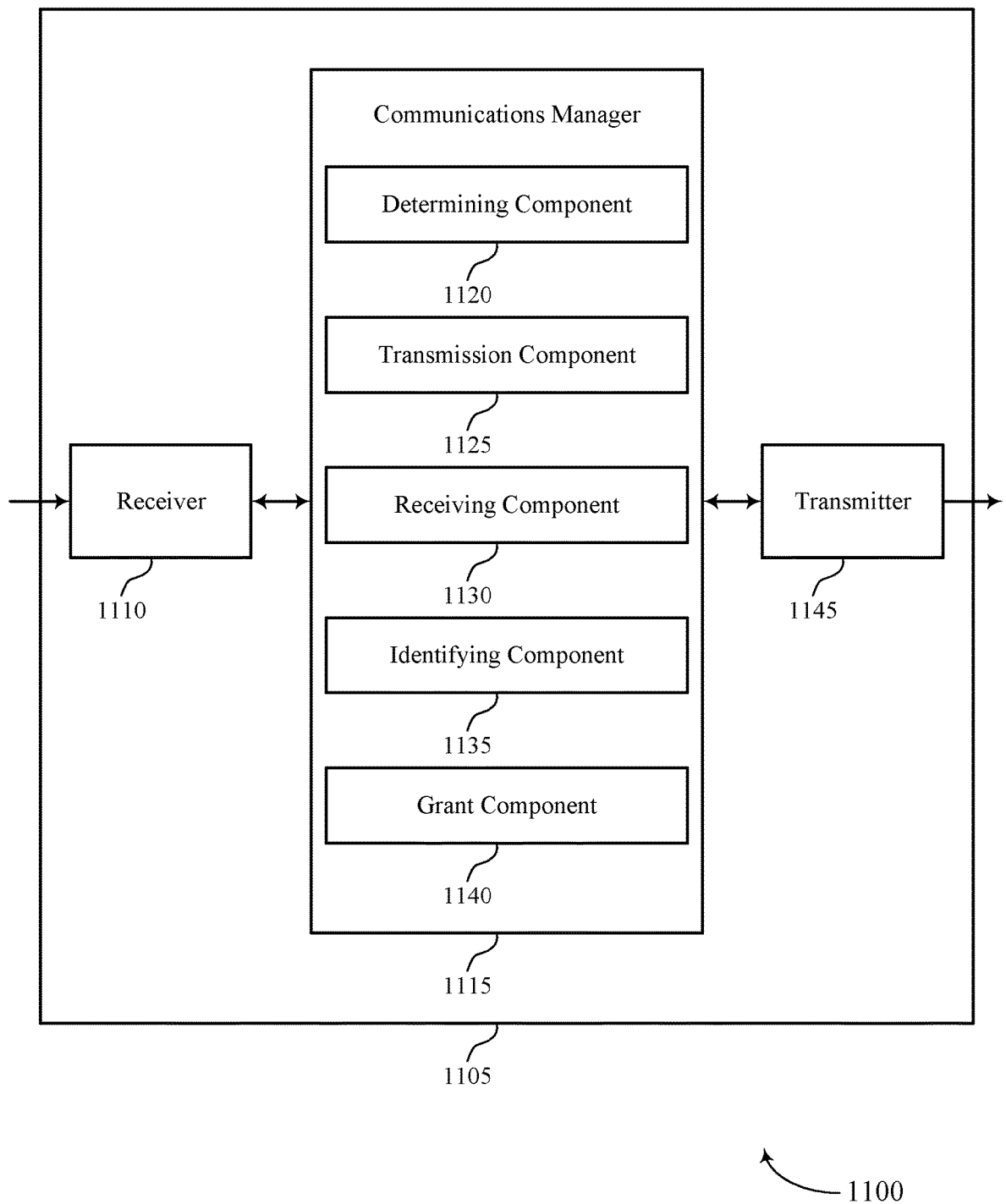

FIG. 11 shows a block diagram 1100 of a device 1105 that supports expiration periods for low latency communications in accordance with aspects of the present disclosure. The device 1105 may be an example of aspects of a device 1005 or a base station 105 as described herein. The device 1105 may include a receiver 1110, a communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to expiration periods for low latency communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a determining component 1120, a transmission component 1125, a receiving component 1130, an identifying component 1135, and a grant component 1140. The communications manager 1115 may be an example of aspects of the communications manager 1310 described herein.

The determining component 1120 may determine an expiration time of a downlink transport block and refrain from retransmitting the downlink transport block based on the expiration time. The transmission component 1125 may transmit a DCI block including a downlink grant for a downlink transport block and an indication of the expiration time of the downlink transport block and transmit the downlink transport block.

The receiving component 1130 may receive an indication of an expiration time of an uplink transport block. The identifying component 1135 may identify a failure to successfully receive the uplink transport block prior to the indicated expiration time. The grant component 1140 may terminate a retransmission grant process associated with the uplink transport block based on the identified failure.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
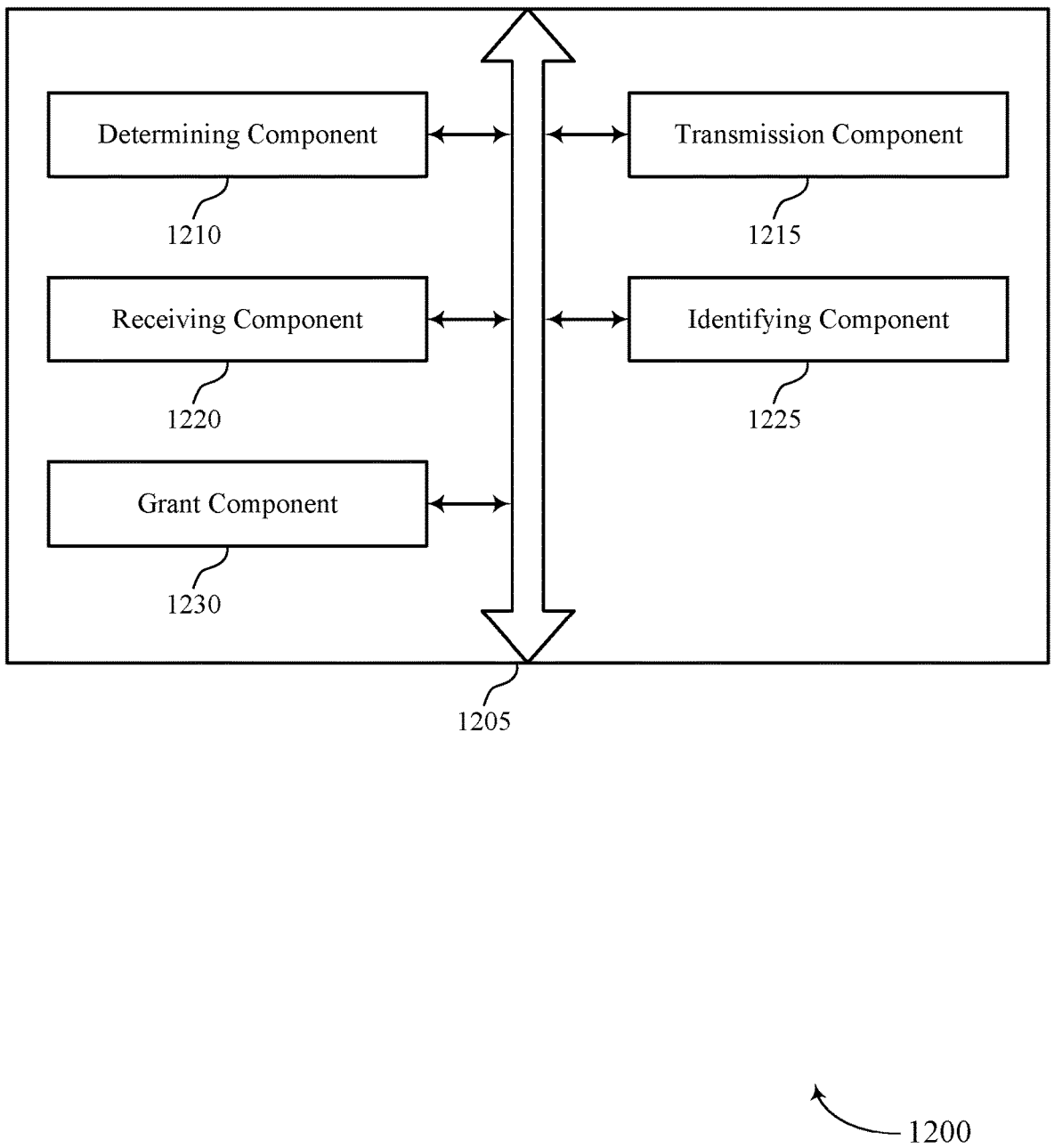
FIG. 12 shows a block diagram of a communications manager that supports expiration periods for low latency communications in accordance with aspects of the present disclosure.

FIG. 12 shows a block diagram 1200 of a communications manager 1205 that supports expiration periods for low latency communications in accordance with aspects of the present disclosure. The communications manager 1205 may be an example of aspects of a communications manager 1015, a communications manager 1115, or a communications manager 1310 described herein. The communications manager 1205 may include a determining component 1210, a transmission component 1215, a receiving component 1220, an identifying component 1225, and a grant component 1230. Each of these modules may communicate, directly or indirectly, with one another (e.g., via one or more buses).

The determining component 1210 may determine an expiration time of a downlink transport block. In some examples, the determining component 1210 may refrain from retransmitting the downlink transport block based on the expiration time. In some examples, the determining component 1210 may configure a new data indicator (NDI) associated with the DCI to further indicate the expiration time.

In some examples, the determining component 1210 may determine a retransmission deadline for the downlink transport block. In some examples, the determining component 1210 may configure a configuration message indicating the retransmission deadline for the downlink transport block. In some examples, the determining component 1210 may configure the downlink grant to indicate the retransmission deadline.

In some examples, the determining component 1210 may determine the expiration time of the uplink transport block based on the indication. In some examples, the determining component 1210 may where the expiration time is determined with respect to one or more of: an ending symbol of a service request (SR) message, or an end of a physical uplink shared channel transmission containing the uplink transport block.

In some examples, the determining component 1210 may determine a value of a new data indicator (NDI) associated with the uplink transport block. In some examples, the determining component 1210 may where the expiration time is determined further based on the value of the NDI. In some examples, the determining component 1210 may determine a retransmission deadline for the uplink transport block.

In some cases, an ending symbol of a scheduled nonacknowledgment (NACK) for the downlink transport block, an end of a physical downlink shared channel transmission containing the downlink transport block, or an end of a base station processing time following a scheduled NACK for the downlink transport block. In some cases, the indication of the expiration time includes an index to a table of standard expiration time values.

The transmission component 1215 may transmit a DCI block including a downlink grant for a downlink transport block and an indication of the expiration time of the downlink transport block. In some examples, the transmission component 1215 may transmit the downlink transport block. In some examples, the transmission component 1215 may transmit the NDI with the DCI block.

In some examples, the transmission component 1215 may transmit at least a portion of the downlink transport block based on the received first NACK and prior to the expiration of the indicated expiration time. In some examples, the transmission component 1215 may transmit the configuration message.

The receiving component 1220 may receive an indication of an expiration time of an uplink transport block.

In some examples, the receiving component 1220 may receive a first non-acknowledgement (NACK) for a downlink transport block. In some examples, the receiving component 1220 may receive a second NACK for the downlink transport block based on an expiration of the retransmission deadline. In some cases, the first NACK and the second NACK are received over different uplink control channel resources. In some cases, the second NACK is received at a greater reception power than the first NACK. In some cases, the second NACK is received as a one-bit uplink control information (UCI) block. In some cases, the second NACK has a higher priority than at least one other uplink control information (UCI) transmission.

In some cases, the indication of the expiration time includes an index to a table of standard expiration time values. In some cases, the indication of the expiration time is received as a multi-bit service request (SR). In some cases, the indication of the expiration time is received over a grant-free uplink data channel. In some cases, the indication of the expiration time is received in a buffer status report (BSR) message.

The identifying component 1225 may identify a failure to successfully receive the uplink transport block prior to the indicated expiration time. The grant component 1230 may terminate a retransmission grant process associated with the uplink transport block based on the identified failure.

In some examples, the grant component 1230 may determine whether to transmit a retransmission grant for the uplink transport block based on the expiration time. In some examples, the grant component 1230 may refrain from sending a retransmission grant for the uplink transport block based on the expiration time. In some examples, the grant component 1230 may transmit a first retransmission grant for the uplink transport block.

Figure 13:
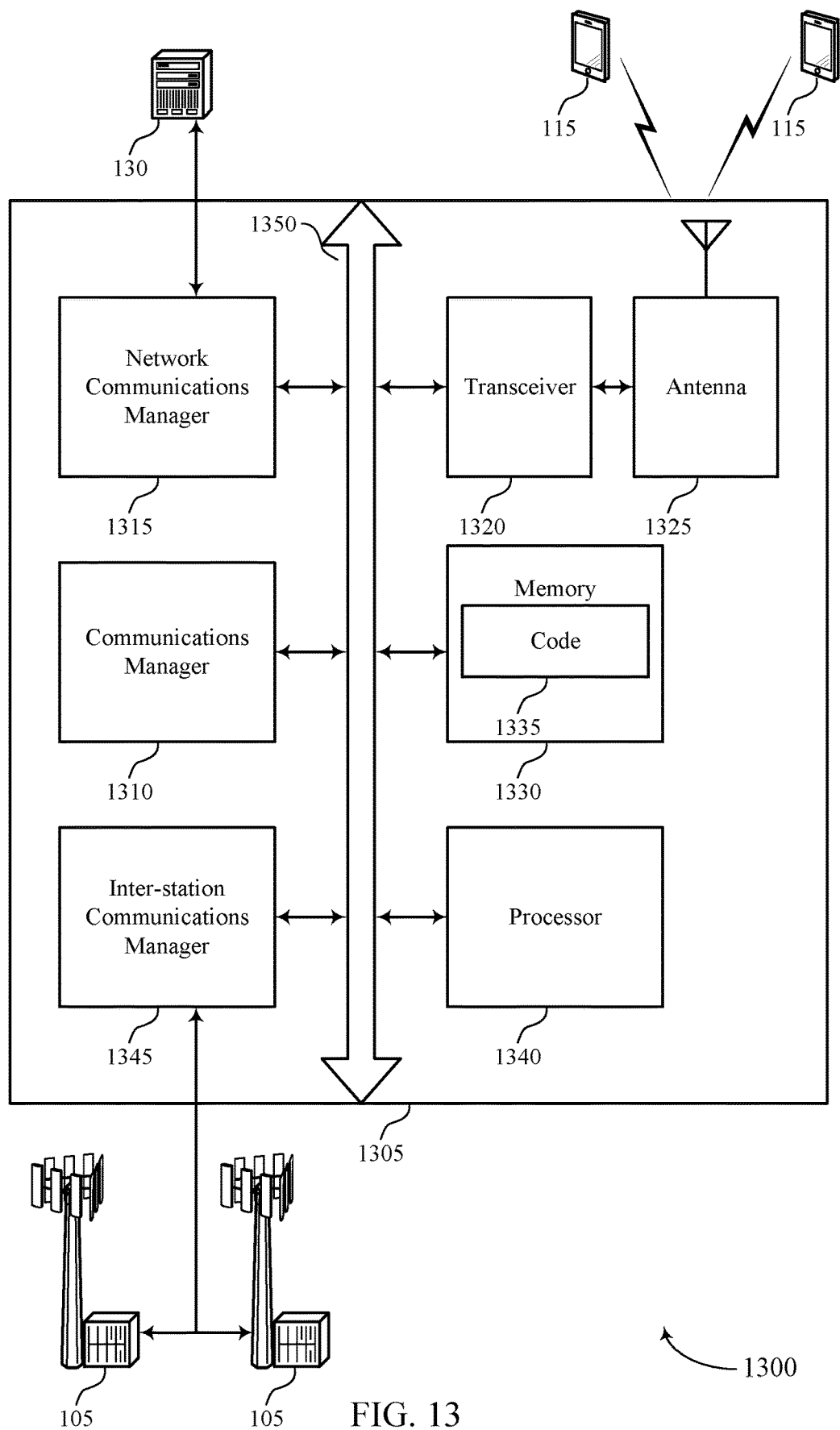
FIG. 13 shows a diagram of a system including a device that supports expiration periods for low latency communications in accordance with aspects of the present disclosure.

FIG. 13 shows a diagram of a system 1300 including a device 1305 that supports expiration periods for low latency communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may determine an expiration time of a downlink transport block, refrain from retransmitting the downlink transport block based on the expiration time, transmit a DCI block including a downlink grant for a downlink transport block and an indication of the expiration time of the downlink transport block, and transmit the downlink transport block. The communications manager 1310 may also receive an indication of an expiration time of an uplink transport block, identify a failure to successfully receive the uplink transport block prior to the indicated expiration time, and terminate a retransmission grant process associated with the uplink transport block based on the identified failure.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device #{device} to perform various functions (e.g., functions or tasks supporting expiration periods for low latency communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
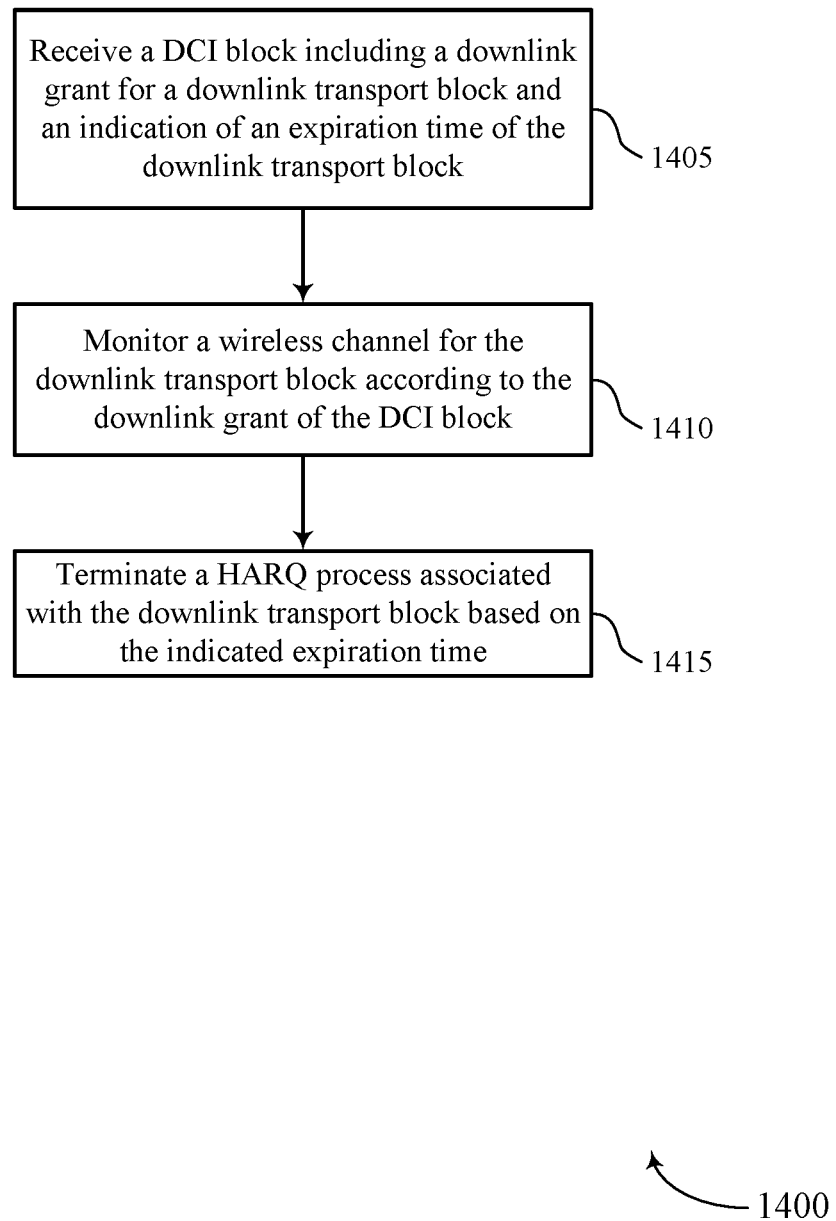
FIGS. 14 through 18 show flowcharts illustrating methods that support expiration periods for low latency communications in accordance with aspects of the present disclosure.

FIG. 14 shows a flowchart illustrating a method 1400 that supports expiration periods for low latency communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a DCI block including a downlink grant for a downlink transport block and an indication of an expiration time of the downlink transport block. The operations of 1405 may be performed according to the methods described herein. In some examples, aspects of the operations of 1405 may be performed by a receiving component as described with reference to FIGS. 6 through 9.

At 1410, the UE may monitor a wireless channel for the downlink transport block according to the downlink grant of the DCI block. The operations of 1410 may be performed according to the methods described herein. In some examples, aspects of the operations of 1410 may be performed by an identifying component as described with reference to FIGS. 6 through 9.

At 1415, the UE may terminate a HARQ process associated with the downlink transport block based on the indicated expiration time. The operations of 1415 may be performed according to the methods described herein. In some examples, aspects of the operations of 1415 may be performed by a HARQ component as described with reference to FIGS. 6 through 9.

Figure 15:
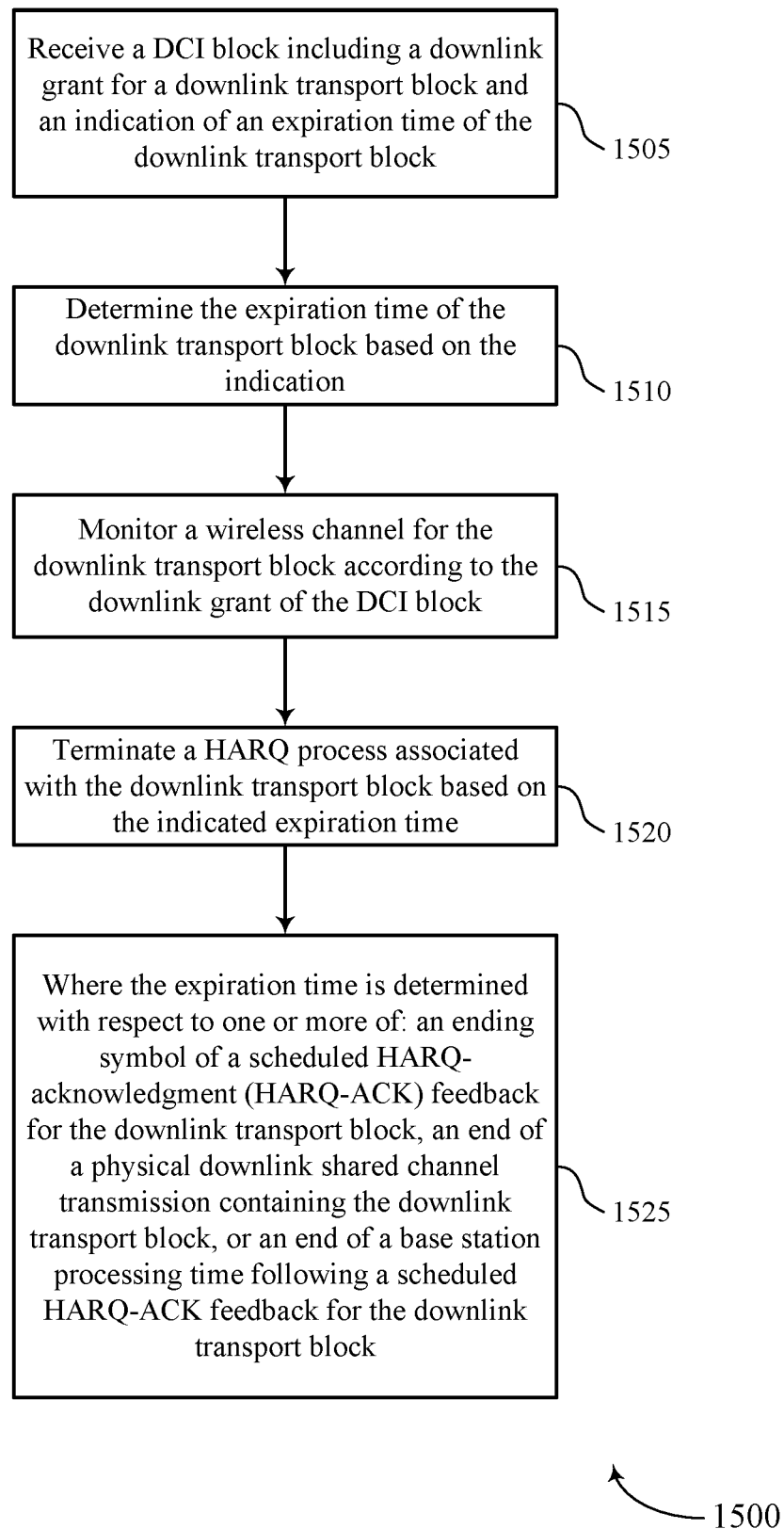

FIG. 15 shows a flowchart illustrating a method 1500 that supports expiration periods for low latency communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1505, the UE may receive a DCI block including a downlink grant for a downlink transport block and an indication of an expiration time of the downlink transport block. The operations of 1505 may be performed according to the methods described herein. In some examples, aspects of the operations of 1505 may be performed by a receiving component as described with reference to FIGS. 6 through 9.

At 1510, the UE may determine the expiration time of the downlink transport block based on the indication. The operations of 1510 may be performed according to the methods described herein. In some examples, aspects of the operations of 1510 may be performed by a determining component as described with reference to FIGS. 6 through 9.

At 1515, the UE may monitor a wireless channel for the downlink transport block according to the downlink grant of the DCI block. The operations of 1515 may be performed according to the methods described herein. In some examples, aspects of the operations of 1515 may be performed by an identifying component as described with reference to FIGS. 6 through 9.

At 1520, the UE may terminate a HARQ process associated with the downlink transport block based on the indicated expiration time. The operations of 1520 may be performed according to the methods described herein. In some examples, aspects of the operations of 1520 may be performed by a HARQ component as described with reference to FIGS. 6 through 9.

At 1525, the UE may determine the expiration time with respect to one or more of: an ending symbol of a scheduled HARQ-acknowledgment (HARQ-ACK) feedback for the downlink transport block, an end of a physical downlink shared channel transmission containing the downlink transport block, or an end of a base station processing time following a scheduled HARQ-ACK feedback for the downlink transport block. The operations of 1525 may be performed according to the methods described herein. In some examples, aspects of the operations of 1525 may be performed by a determining component as described with reference to FIGS. 6 through 9.

Figure 16:
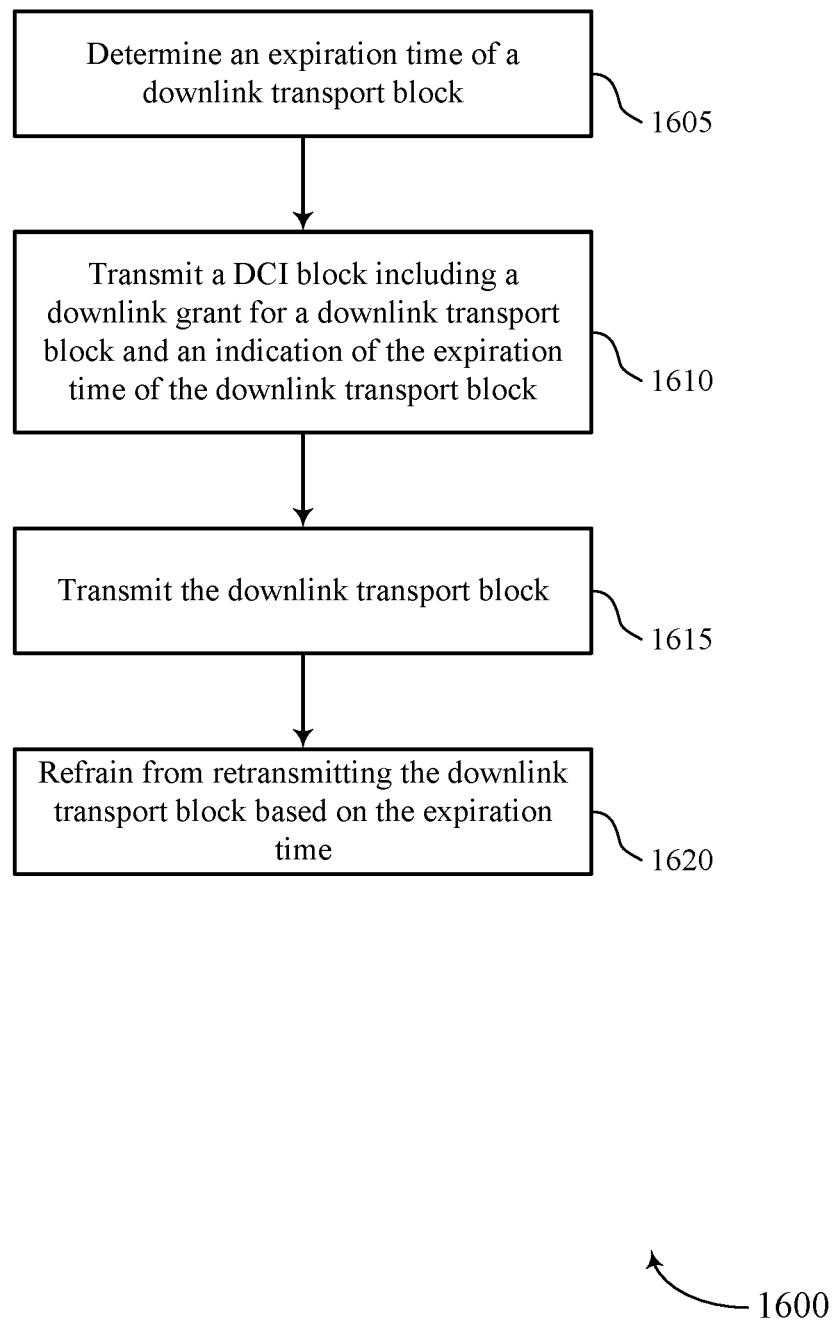

FIG. 16 shows a flowchart illustrating a method 1600 that supports expiration periods for low latency communications in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1605, the base station may determine an expiration time of a downlink transport block. The operations of 1605 may be performed according to the methods described herein. In some examples, aspects of the operations of 1605 may be performed by a determining component as described with reference to FIGS. 10 through 13.

At 1610, the base station may transmit a DCI block including a downlink grant for a downlink transport block and an indication of the expiration time of the downlink transport block. The operations of 1610 may be performed according to the methods described herein. In some examples, aspects of the operations of 1610 may be performed by a transmission component as described with reference to FIGS. 10 through 13.

At 1615, the base station may transmit the downlink transport block. The operations of 1615 may be performed according to the methods described herein. In some examples, aspects of the operations of 1615 may be performed by a transmission component as described with reference to FIGS. 10 through 13.

At 1620, the base station may refrain from retransmitting the downlink transport block based on the expiration time. The operations of 1620 may be performed according to the methods described herein. In some examples, aspects of the operations of 1620 may be performed by a determining component as described with reference to FIGS. 10 through 13.

Figure 17:
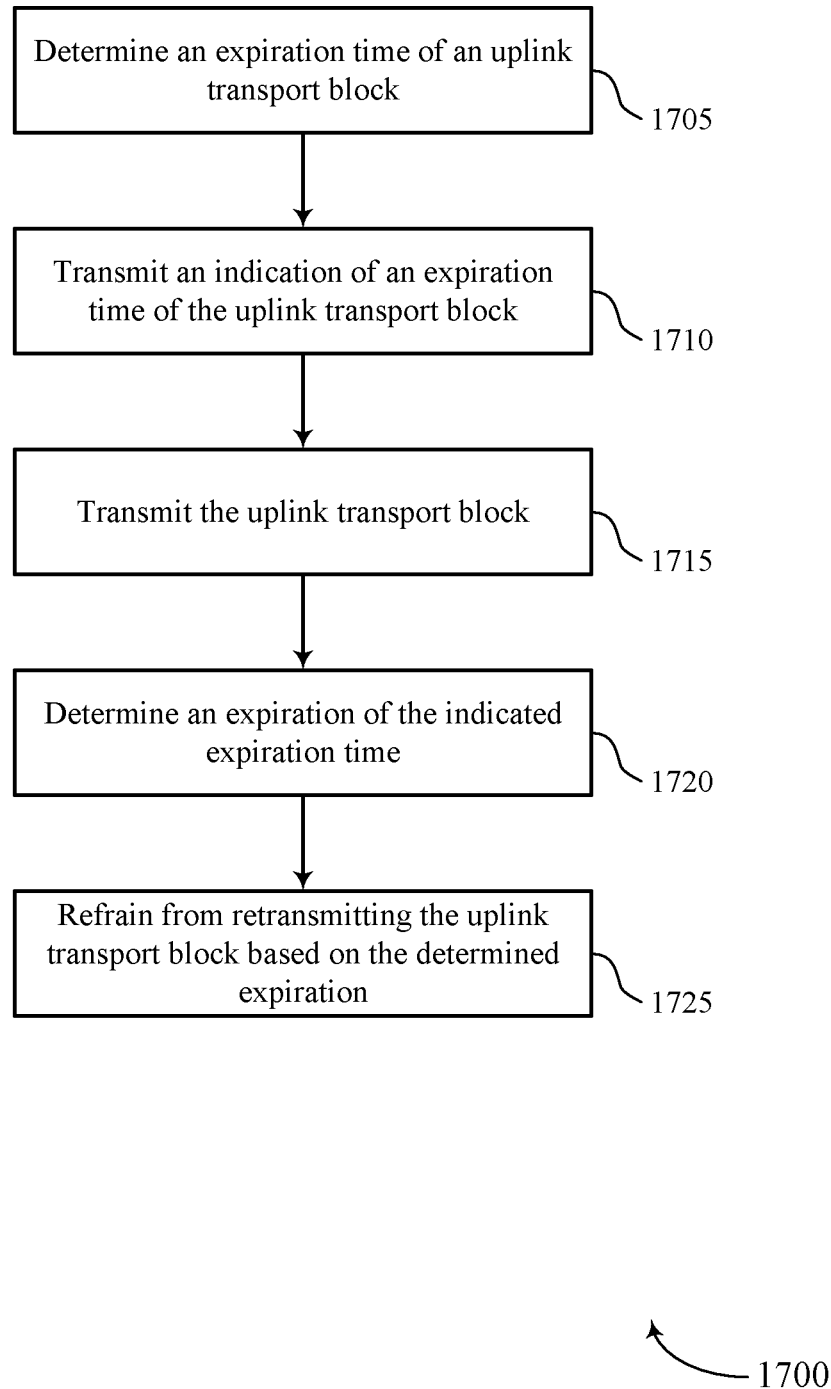

FIG. 17 shows a flowchart illustrating a method 1700 that supports expiration periods for low latency communications in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1705, the UE may determine an expiration time of an uplink transport block. The operations of 1705 may be performed according to the methods described herein. In some examples, aspects of the operations of 1705 may be performed by a determining component as described with reference to FIGS. 6 through 9.

At 1710, the UE may transmit an indication of the expiration time of the uplink transport block. The operations of 1710 may be performed according to the methods described herein. In some examples, aspects of the operations of 1710 may be performed by a transmission component as described with reference to FIGS. 6 through 9.

At 1715, the UE may transmit the uplink transport block. The operations of 1715 may be performed according to the methods described herein. In some examples, aspects of the operations of 1715 may be performed by a transmission component as described with reference to FIGS. 6 through 9.

At 1720, the UE may determine an expiration of the indicated expiration time. The operations of 1720 may be performed according to the methods described herein. In some examples, aspects of the operations of 1720 may be performed by an expiration component as described with reference to FIGS. 6 through 9.

At 1725, the UE may refrain from retransmitting the uplink transport block based on the determined expiration. The operations of 1725 may be performed according to the methods described herein. In some examples, aspects of the operations of 1725 may be performed by a determining component as described with reference to FIGS. 6 through 9.

Figure 18:
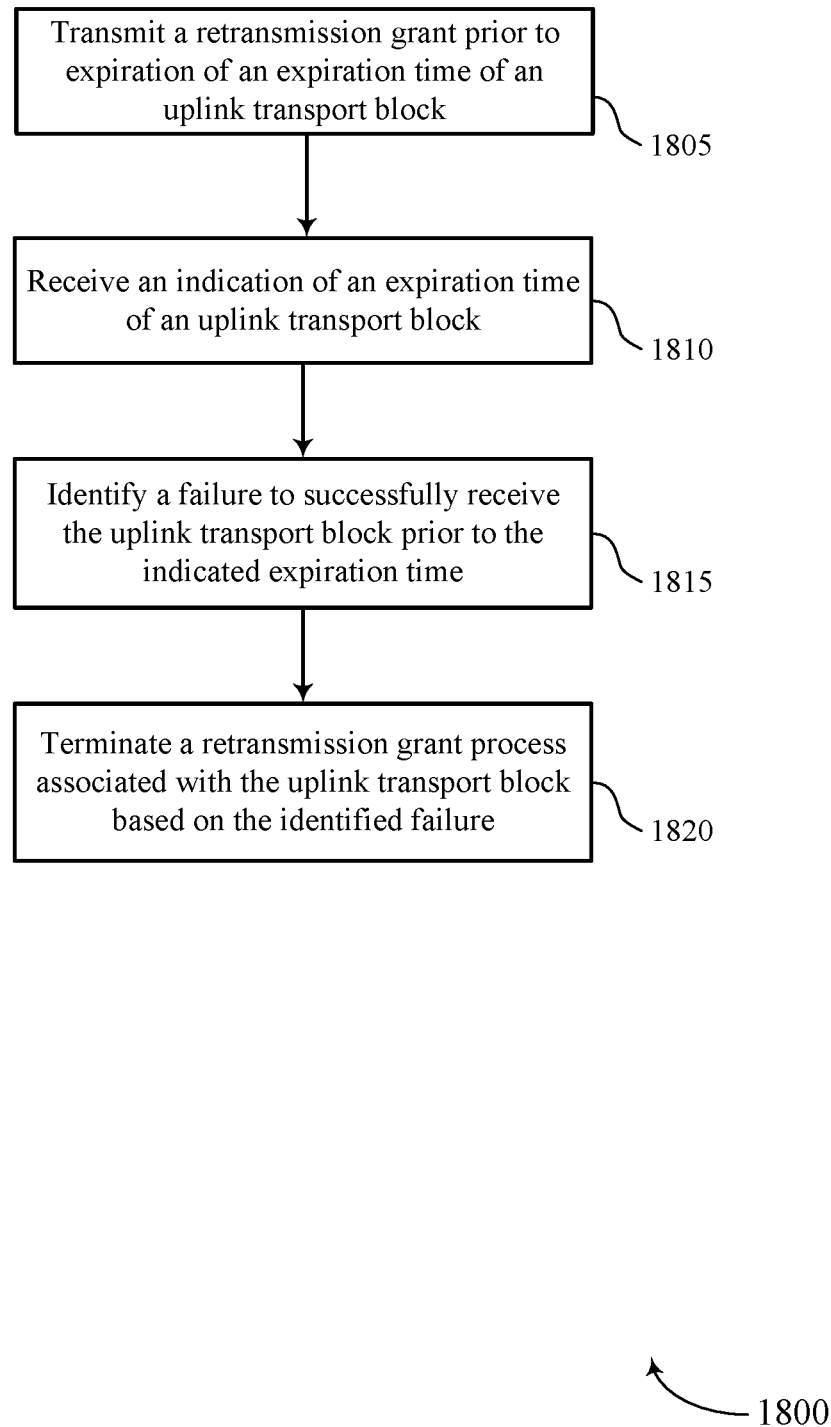

FIG. 18 shows a flowchart illustrating a method 1800 that supports expiration periods for low latency communications in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1805, the base station may transmit a retransmission grant prior to expiration of an expiration time of an uplink transport block. The operations of 1805 may be performed according to the methods described herein. In some examples, aspects of the operations of 1805 may be performed by a transmitting component as described with reference to FIGS. 10 through 13.

At 1810, the base station may receive an indication of an expiration time of an uplink transport block. The operations of 1810 may be performed according to the methods described herein. In some examples, aspects of the operations of 1810 may be performed by a receiving component as described with reference to FIGS. 10 through 13.

At 1815, the base station may identify a failure to successfully receive the uplink transport block prior to the indicated expiration time. The operations of 1815 may be performed according to the methods described herein. In some examples, aspects of the operations of 1815 may be performed by an identifying component as described with reference to FIGS. 10 through 13.

At 1820, the base station may terminate a retransmission grant process associated with the uplink transport block based on the identified failure. The operations of 1820 may be performed according to the methods described herein. In some examples, aspects of the operations of 1820 may be performed by a grant component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
    receiving a downlink control information (DCI) message comprising a downlink grant for a downlink transport block and an indication of an expiration time of the downlink transport block;
    monitoring a wireless channel for the downlink transport block according to the downlink grant of the DCI message; and terminating, based at least in part on a failure to successfully decode the downlink transport block prior to the expiration time, a hybrid automatic repeat request (HARQ) process associated with the downlink transport block by emptying a HARQ buffer corresponding to the downlink transport block.

2. The method of claim 1, further comprising:
determining the expiration time of the downlink transport block based at least in part on the indication, wherein the expiration time is determined with respect to one or more of:
an ending symbol of a scheduled HARQ-acknowledgment (HARQ-ACK) feedback for the downlink transport block, an end of a physical downlink shared channel transmission containing the downlink transport block, or an end of a network device processing time following a scheduled HARQ-ACK feedback for the downlink transport block.

3. The method of claim 2, further comprising:
determining a value of a new data indicator (NDI) associated with the DCI message, wherein the expiration time is determined further based at least in part on the value of the NDI.

4. The method of claim 1, further comprising:
determining whether to transmit a HARQ-acknowledgment (HARQ-ACK) feedback for the downlink transport block based at least in part on the expiration time.

5. The method of claim 4, wherein terminating the HARQ process associated with the downlink transport block comprises:
refraining from sending HARQ feedback for the downlink transport block based at least in part on the expiration time.

6. The method of claim 1, further comprising:
identifying the failure to successfully decode the downlink transport block; and
transmitting a first non-acknowledgment (NACK) for the downlink transport block.

7. The method of claim 6, further comprising:
determining a retransmission deadline for the downlink transport block based at least in part on the expiration time.

8. The method of claim 7, further comprising:
receiving a configuration message indicating the retransmission deadline for the downlink transport block.

9. The method of claim 7, wherein the retransmission deadline is determined based at least in part on the downlink grant.

10. The method of claim 7, further comprising:
transmitting a second NACK for the downlink transport block based at least in part on an expiration of the retransmission deadline.

11. The method of claim 10, further comprising:
determining a retransmission grant is not received prior to the expiration of the retransmission deadline; wherein transmitting the second NACK is further based on determining the retransmission grant is not received.

12. The method of claim 10, wherein the first NACK and the second NACK are transmitted over different uplink control channel resources.

13. The method of claim 10, wherein the second NACK is transmitted at a greater transmit power than the first NACK.

14. The method of claim 10, wherein the second NACK is transmitted as a one-bit uplink control information (UCI) block.

15. The method of claim 10, wherein the second NACK has a higher priority than at least one other uplink control information (UCI) transmission.

16. The method of claim 1, wherein the indication of the expiration time comprises an index to a table of standard expiration time values.

17. The method of claim 1, further comprising:
determining whether a transmission opportunity exists for a HARQ feedback for the downlink transport block prior to the indicated expiration time.

18. The method of claim 1, further comprising:
determining an index to a table of standard expiration time values based on at least one parameter of the DCI message or at least one parameter of a downlink control channel carrying the DCI message.

19. The method of claim 1, further comprising:
receiving the downlink transport block based at least in part on the downlink grant;
identifying the failure to successfully decode the received downlink transport block prior to the expiration time; and
sending an indication of the identified failure to an upper layer of the UE.

20. A user equipment (UE) for wireless communication, comprising:
one or more memories storing processor-executable code; and
one or more processors coupled with the one or more memories and individually or collectively operable to execute the code to cause the UE to:
receive a downlink control information (DCI) message comprising a downlink grant for a downlink transport block and an indication of an expiration time of the downlink transport block;
monitor a wireless channel for the downlink transport block according to the downlink grant of the DCI message; and
terminate, based at least in part on a failure to successfully decode the downlink transport block prior to the expiration time, a hybrid automatic repeat request (HARQ) process associated with the downlink transport block by emptying a HARQ buffer corresponding to the downlink transport block.

21. The UE of claim 20, wherein the one or more processors are individually or collectively further operable to execute the code to cause the UE to:
determine the expiration time of the downlink transport block based at least in part on the indication, wherein the expiration time is determined with respect to one or more of: an ending symbol of a scheduled HARQ-acknowledgment (HARQ-ACK) feedback for the downlink transport block, an end of a physical downlink shared channel transmission containing the downlink transport block, or an end of a network device processing time following a scheduled HARQ-ACK feedback for the downlink transport block.

22. The UE of claim 21, wherein the one or more processors are individually or collectively further operable to execute the code to cause the UE to:
determine a value of a new data indicator (NDI) associated with the DCI message, wherein the expiration time is determined further based at least in part on the value of the NDI.

23. The UE of claim 20, wherein the one or more processors are individually or collectively further operable to execute the code to cause the UE to:

determine whether to transmit a HARQ-acknowledgment (HARQ-ACK) feedback for the downlink transport block based at least in part on the expiration time.

24. The UE of claim 23, wherein, to terminate the HARQ process associated with the downlink transport block, the one or more processors are individually or collectively operable to execute the code to cause the UE to:
refrain from sending HARQ feedback for the downlink transport block based at least in part on the expiration time.

25. The UE of claim 20, wherein the one or more processors are individually or collectively further operable to execute the code to cause the UE to:
identify the failure to successfully decode the downlink transport block; and
transmit a first non-acknowledgment (NACK) for the downlink transport block.

26. The UE of claim 25, wherein the one or more processors are individually or collectively further operable to execute the code to cause the UE to:
determine a retransmission deadline for the downlink transport block based at least in part on the expiration time.

27. The UE of claim 20, wherein the one or more processors are individually or collectively further operable to execute the code to cause the UE to:
determine an index to a table of standard expiration time values based on at least one parameter of the DCI message or at least one parameter of a downlink control channel carrying the DCI message.

28. The UE of claim 20, wherein the one or more processors are individually or collectively further operable to execute the code to cause the UE to:
receive the downlink transport block based at least in part on the downlink grant;
identify the failure to successfully decode the received downlink transport block prior to the expiration time; and
send an indication of the identified failure to an upper layer of the UE.

29. A user equipment (UE) for wireless communication, comprising:
means for receiving a downlink control information (DCI) message comprising a downlink grant for a downlink transport block and an indication of an expiration time of the downlink transport block;
means for monitoring a wireless channel for the downlink transport block according to the downlink grant of the DCI message; and
means for terminating, based at least in part on a failure to successfully decode the downlink transport block prior to the expiration time, a hybrid automatic repeat request (HARQ) process associated with the downlink transport block by emptying a HARQ buffer corresponding to the downlink transport block.

30. A non-transitory computer-readable medium storing code for wireless communication, the code comprising instructions executable by one or more processors to:
receive a downlink control information (DCI) message comprising a downlink grant for a downlink transport block and an indication of an expiration time of the downlink transport block;
monitor a wireless channel for the downlink transport block according to the downlink grant of the DCI message; and
terminate, based at least in part on a failure to successfully decode the downlink transport block prior to the expiration time, a hybrid automatic repeat request (HARQ) process associated with the downlink transport block by emptying a HARQ buffer corresponding to the downlink transport block.

* * * * *